United States Patent
Verma

(10) Patent No.: US 10,452,781 B2
(45) Date of Patent: Oct. 22, 2019

(54) DATA PROVENANCE SYSTEM

(71) Applicant: CA, Inc., Islandia, NY (US)

(72) Inventor: Vineet Verma, Hyderabad (IN)

(73) Assignee: CA, Inc., Islandia, NY (US)

( * ) Notice: Subject to any disclaimer, the term of this patent is extended or adjusted under 35 U.S.C. 154(b) by 94 days.

(21) Appl. No.: 15/604,428

(22) Filed: May 24, 2017

(65) Prior Publication Data

US 2018/0341631 A1     Nov. 29, 2018

(51) Int. Cl.
*G06F 17/27*     (2006.01)

(52) U.S. Cl.
CPC ...... *G06F 17/2785* (2013.01); *G06F 17/2765* (2013.01)

(58) Field of Classification Search
USPC ............................................................ 704/9
See application file for complete search history.

(56) References Cited

U.S. PATENT DOCUMENTS

| | | | |
|---|---|---|---|
| 8,503,786 B2 * | 8/2013 | Sata ..................... | G06F 17/241 382/181 |
| 2018/0081861 A1 * | 3/2018 | Danielyan ........... | G06F 17/2785 |
| 2018/0124046 A1 * | 5/2018 | Verma ................. | H04L 63/0861 |
| 2018/0341701 A1 * | 11/2018 | Verma ............... | G06F 17/30722 |
| 2018/0351956 A1 * | 12/2018 | Verma .................. | H04L 63/102 |

* cited by examiner

*Primary Examiner* — Satwant K Singh
(74) *Attorney, Agent, or Firm* — Alliance IP, LLC

(57) ABSTRACT

An electronic artifact is accessed which includes content of a particular type of media. Text is determined corresponding to the content and natural language processing is performed on the text to identify at least a subset of words in a statement within the text and determine meanings of each word in the subset of words. A context image is generated for the electronic artifact based on the natural language processing, where the context image includes a graph including nodes corresponding to the subset of words and the context image defines relationships between the subset of words.

18 Claims, 13 Drawing Sheets

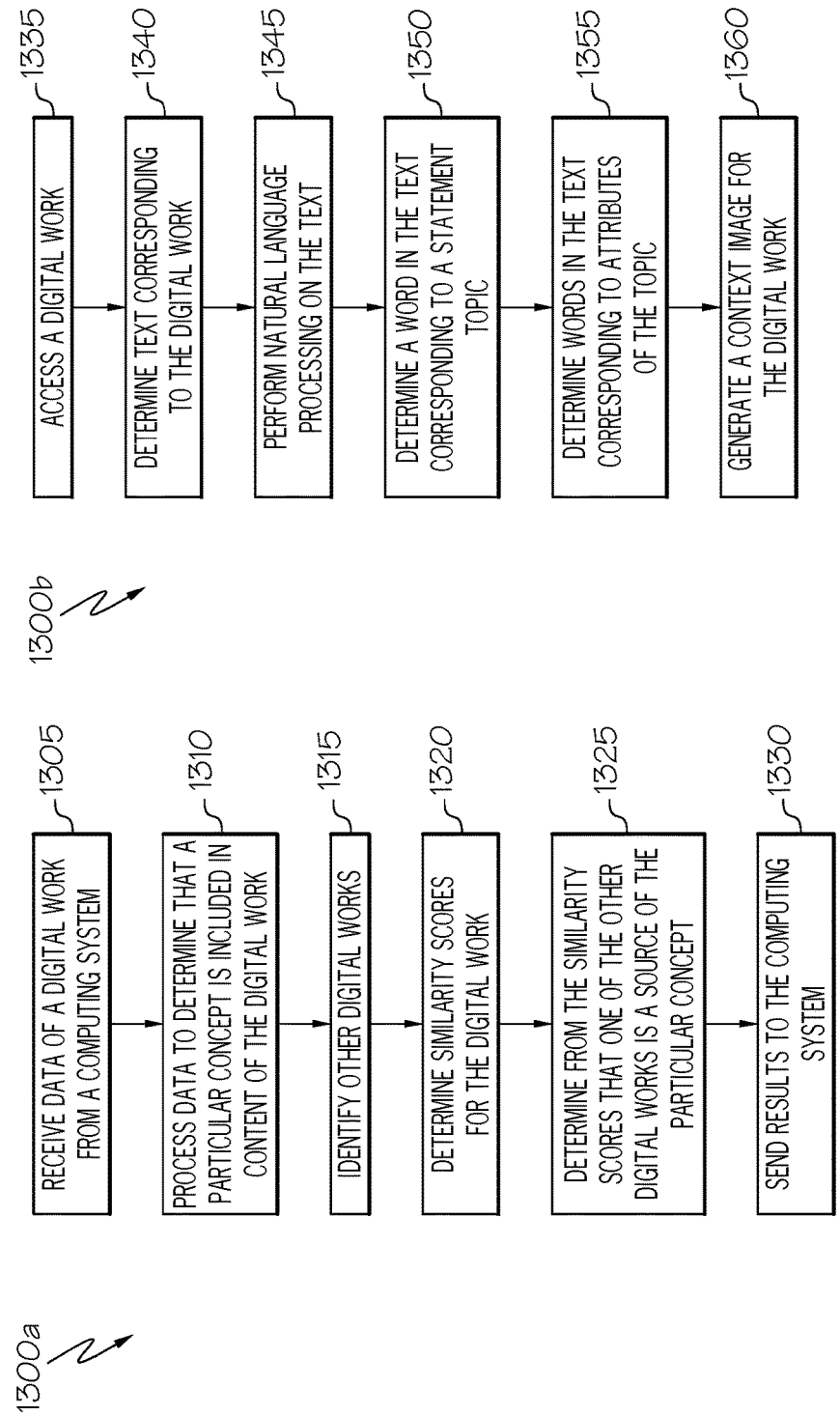

US 10,452,781 B2

DATA PROVENANCE SYSTEM

BACKGROUND

The present disclosure relates in general to the field of computer systems, and more specifically, to analysis of digital artifacts within a computing system.

With the emergence of personal computing and the Internet an ever increasing mass of digital works are being produced and published. These digital works include, not only those works, which are being created on a daily basis by the hundreds of millions of interconnected users, but also through the digitalization of the vast libraries of existing works. Such works may take a variety of forms, including works of literature, science, art, photography, video, audio, and so on. These works build upon each other and, in some cases, reference one another as sources. In some fields, proper attribution of source material may carry with it strong monetary, cultural, and/or legal implications and incentives. Accordingly, failure to identify and follow these norms can carry serious consequences. On the other hand, the digital nature of modern works and the myriad tools available to copy and share digital works has made plagiarism, intellectual property infringement, and misappropriation of digital works increasingly common and difficult to detect and enforce.

BRIEF SUMMARY

According to one aspect of the present disclosure, data may be received from a computing system describing particular content of a digital work. The data may be processed to identify a particular concept represented in the particular content. A search of a corpus may be initiated to identify a set of other digital works in the corpus including content related to the particular concept. Similarity scores may be determined representing a degree of similarity between the particular content of the digital work and the respective content of each of the set of digital works related to the particular concept. A data provenance system can determine that a particular one of the other digital works is a source of the particular content of the digital work based on the similarity scores. Result data may be generated and sent to the computing system to indicate that the particular other digital work is a source of the particular concept.

According to another aspect of the present disclosure, an electronic artifact may be accessed, which includes content of a particular type of media. Text may be determined corresponding to the content and natural language processing may be performed on the text to identify at least a subset of words in a statement within the text and determine meanings of each word in the subset of words. A context image may be generated for the electronic artifact based on the natural language processing, where the context image includes a graph including nodes corresponding to the subset of words and the context image defines relationships between the subset of words.

BRIEF DESCRIPTION OF THE DRAWINGS

FIGS. 13A-13B illustrate flowcharts showing example techniques for performing data provenance system on digital artifacts.

Like reference numbers and designations in the various drawings indicate like elements.

DETAILED DESCRIPTION

Figure 1:
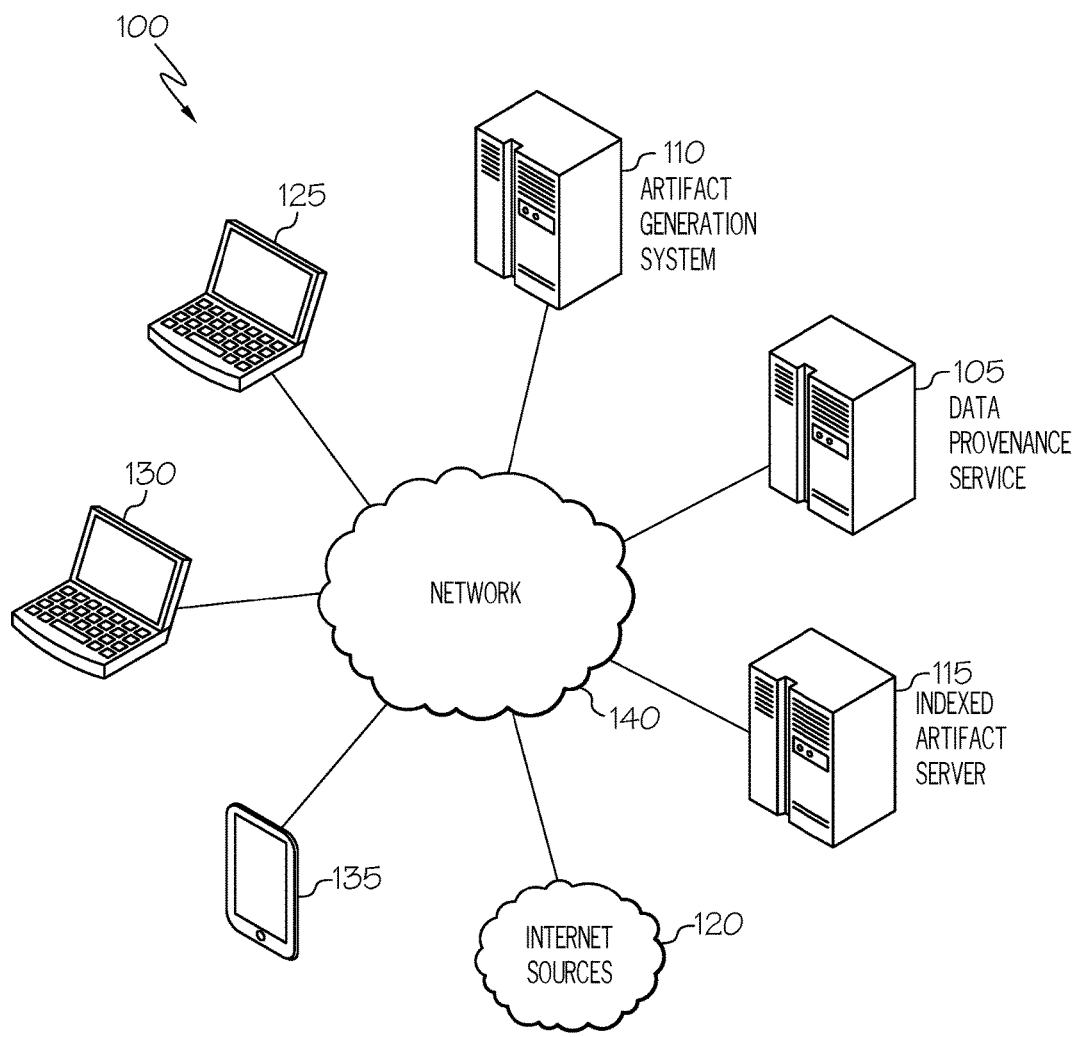
FIG. 1 illustrates a simplified schematic diagram of an example computing environment including an example data provenance system.

As will be appreciated by one skilled in the art, aspects of the present disclosure may be illustrated and described herein in any of a number of patentable classes or contexts, including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or as a combination of software and hardware implementations, all of which may generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), or in a cloud computing environment, or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices, to produce a computer implemented process such that the instructions which execute on the computer or other programmable apparatus provide processes for implementing the functions/acts specified in the flowchart and/or block diagram block or blocks.

FIG. 1 illustrates a simplified schematic diagram of an example computing environment 100. In some embodiments, computing environment 100 may include functionality to enable a data provenance service system (e.g., 105) capable of assessing various digital content included in digital works, or "electronic artifacts" (or simply "artifacts"), in any one of a myriad of media types (or combination of media types) such as text documents and multimedia files, audio, video and images. The artifacts may be generated utilizing a variety of different systems and may be authored by a variety of different users, publishers, or other entities. In some cases, an artifact generation system 110 may be provided, which may be used to generate various types of artifacts in one or more different media types. An artifact generation system 110 may be hosted, in some cases, locally at user endpoint devices (e.g., 125, 130, 135). In other cases, the artifact generation system 110 may be provided as a web-based application, service, or other system hosted at least in part on a system remote from user endpoint devices utilized to provide user interfaces to the artifact generation system 110. In still other examples, artifact generation system 100 may be combined with or may otherwise interoperate with data provenance system 105 to allow the content generated for or incorporated into an artifact using the artifact generation system to be assessed, in some cases, in real time, to determine whether content of the artifact has likely been sourced, advertently or inadvertently, from another preexisting artifact. In some cases, the data provenance system can determine that content from one artifact of a first media type has been incorporated as a different second media type in another artifact, such as a new artifact generated using the artifact generation system 110.

The data provenance system 105 can additionally track versioning of an artifact as it is modified by various parties using artifact generators or editors, including artifact generation system 110. The data provenance system 105 can thereby map particular content portions not only to another source artifact, but may also identify a particular version of that source artifact from a trail tree generated for the source artifact to track modifications and versioning of the source artifact. The data provenance system 105 may further utilize and contribute records to a corpus of indexed records, which memorialize the various artifacts known to the data provenance system 105. The data provenance system 105 may compare content of newly generated or identified artifacts against the content of artifacts described in the indexed records. In some cases, the indexed corpus may be hosted and maintained by an indexed artifact server (e.g., 115). In some implementations, the indexed artifact server 115 may be combined with the data provenance system 105, among other examples. Further, artifacts indexed in a corpus of indexed artifacts (e.g., maintained by indexed artifact server 115) may further include records memorializing versioning of each of the artifacts in the index, for instance, through corresponding trail tree records.

The data provenance system 105 may supplement a search of indexed artifacts with searches of other artifact repositories and sources, include corpuses not indexed for particular use by the data provenance system 105. For instance, web crawlers or other tools may be utilized to search other repositories, including resources on the Internet (e.g., 120), to identify artifacts, which may potentially be the source of content included in a particular artifact or which, themselves, include content believed to be sourced by another artifact (e.g., an artifact documented in a collection of indexed artifacts, such as hosted by indexed artifact server 115)), among other example implementations. The data provenance system 105 may determine similarities between artifacts accessed from an indexed artifact server (e.g., 115), the Internet (e.g., 120), or other sources and utilize these similarities to determine that one artifact incorporates subject matter appearing earlier in the content of another artifact. The data provenance system 105 may additionally provide automated attribution (within the artifact that appropriates the previously authored content), automated citations, intellectual property licensing suggestions and auditing, notifications of use (i.e., to the author or originator of content being appropriated in another artifact), among other example results based on these determined similarities.

As noted above, a system (e.g., 100) may further include one or more end-user devices (e.g., 125, 130, 135), which may be utilized in some cases to allow a user to interface with and interact with various other systems and components of the computing environment 100, including data provenance system 105. For example, content developers may utilize tools, such as artifact generation system 110, to develop various types of artifacts or to modify previous artifact versions. A user may submit a particular artifact to the data provenance system for analysis to determine whether the particular artifact incorporates subject matter of other existing artifacts and/or to determine whether other artifacts incorporate subject matter originally presented in the particular artifact. In some cases, this analysis can take place as or immediately after a version of the artifact is generated. A copy of the artifact may be provided to the data provenance system 105 and may be analyzed and indexed for inclusion, with other artifacts, in an indexed artifact server 110 or other data store. User devices (e.g., 125, 130, 135) may additionally be used to consume results generated by the data provenance system 105. For instance, the data provenance system 105 may provide recommendations or even automatically insert citations or other accreditation into an analyzed artifact based on determining similarities of content included in the artifact. Other client systems (e.g., other than a client system used to author the analyzed artifact or used to submit an artifact for analysis to the data provenance system 105 may receive results of the analysis. For instance, the data provenance system 105 may be used to offer a subscription service to allow artifact owners to be alerted and track the appropriation of content from artifacts, which they own, among other examples.

One or more networks 140 may be used to communicatively couple the components of computing environment 100, including, for example, local area networks, wide area networks, public networks, the Internet, cellular networks, Wi-Fi networks, short-range networks (e.g., Bluetooth or ZigBee), and/or any other wired or wireless communication medium. For example, a data provenance system 105 may connect to sources of various artifacts to search for artifacts with similar content, build indexed collections of known artifacts, provide results of analyses of various artifacts, and other example tasks using network(s) 140, among other examples.

In general, elements of computing environment 100, such as "systems," "servers," "services," "hosts," "devices," "clients," "networks," "mainframes," "computers," and any components thereof (e.g., 105, 110, 115, 125, 130, 135, etc.), may include electronic computing devices operable to receive, transmit, process, store, or manage data and information associated with computing environment 100. As used in this disclosure, the term "computer," "processor," "processor device," or "processing device" is intended to encompass any suitable processing device. For example, elements shown as single devices within computing environment 100 may be implemented using a plurality of computing devices and processors, such as server pools comprising multiple server computers. Further, any, all, or some of the computing devices may be adapted to execute any operating system, including Linux, other UNIX variants, Microsoft Windows, Windows Server, Mac OS, Apple iOS, Google Android, etc., as well as virtual machines adapted to virtualize execution of a particular operating system, including customized and/or proprietary operating systems.

Further, elements of computing environment 100 (e.g., 105, 110, 115, 125, 130, 135, etc.) may each include one or more processors, computer-readable memory, and one or more interfaces, among other features and hardware. Servers may include any suitable software component or module, or computing device(s) capable of hosting and/or serving software applications and services, including distributed, enterprise, or cloud-based software applications, data, and services. For instance, in some implementations, a data provenance system 105, artifact generation tool (e.g., 110), indexed artifact server 115, and/or other sub-systems or components of computing environment 100, may be at least partially (or wholly) cloud-implemented, "fog"-implemented, web-based, or distributed for remotely hosting, serving, or otherwise managing data, software services, and applications that interface, coordinate with, depend on, or are used by other components of computing environment 100. In some instances, elements of computing environment 100 may be implemented as some combination of components hosted on a common computing system, server, server pool, or cloud computing environment, and that share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Given the rapid expansion and digital nature of data on the Internet, it is becoming increasingly and exponentially difficult to determine the origins of data and the ideas embodied in this data. Data provenance refers to the tracing and trailing of the origins of data and its movement across the various data stores (e.g., data farms and data repositories) in the Internet. Efforts toward establishing and maintaining data provenance may be useful in a variety of academic and professional fields. For instance, data provenance may be particularly important in the maintenance of scientific databases, due to fields of innovation where accreditation and citation are considered akin to currency. The individual entities in such databases may include collections of artifacts in any one of a myriad of media types (or combination of media types) such as text documents and multimedia files, audio, video and images. The diversity of these artifacts and the types of media employed may, among other considerations, complicate the maintenance of data provenance.

In some implementations, to establish data provenance, relationships or similarities between artifacts are determined, so as to identify and understand how one work may incorporate in whole or in part, through rote copying or (less transparently) through paraphrasing, concepts included in the content of another document. A data provenance system or service may be provided with machine executable logic for determining how any two artifacts in a corpus of artifacts are different from each other and how the artifacts may be co-related to understand how much similarity of concept or content they have. In some implementations, a data provenance system may be provided a service for use by a variety of client systems to support the discovery of data provenance issues in artifacts generated, stored, or otherwise maintained by the client systems. In some implementations, specialized data structures, such as context images, may be developed from the artifacts to permit an example data provenance system to perform robust, syntax independent comparisons between the content of different artifacts, including artifacts of differing media types, among other example features.

Data provenance may refer to and model the lineage of data. Tracing the provenance of an electronic artifact may be performed to provide contextual and circumstantial evidence for its original production or discovery, by establishing, as far as practicable, its later history, especially the sequences of its formal ownership, custody, and places of storage. The practice may have additional value in helping authenticate artifacts. Data provenance, including software code provenance, encompasses the origin of data and software products, and may be utilized to support and automate the auditing and enforcement of licensing terms, accreditation rules, and other agreements and norms. Ownership and data usage represent key aspects of data provenance, where ownership identifies who (e.g., a particular author or entity) is responsible for the artifact source, ideally including information on the originator of the artifact, and data usage details how the data was used and modified and often includes information on how to cite the data source or sources, among other examples.

The digital nature of data can make the determination and measurement of data provenance of particular concern and difficulty, as data sets are often (and easily) modified, including the occasional copying or appropriating of concepts in content of a particular source artifact without legitimate citation or acknowledgment of the originating data set. Indeed, databases, word processors, video and audio editing tools, photo editors, web publishing tools, and other tools are now widely available and make it easy for users to select specific information from existing artifacts and merge this data with other data sources without any documentation of how the data was obtained or how it was modified from the original data set or sets.

An example system, such as set forth in some of the examples herein, may provide a data provenance service (e.g., Data Provenance as a Service (DPaaS)) that can scout, trace, trail and annotate data and artifacts across locations on web and internal data stores. This service can be used, for instance, by corporations as well as individuals to validate and publish their works. For example, a data provenance service may scan a particular artifact for key terms and concepts, apply analytics to understand the artifact, compare the analyzed artifact against indexed artifacts and/or initiate web crawlers, to find published artifacts, generate similarity score based on analytics, annotate and associate credits to these other artifacts if it is determined that corresponding content in the particular artifact is sourced from the other artifacts, and generate an artifact trail tree for the particular artifact to maintain a record of versioning of the particular artifact (as well as other artifacts).

Figure 2:
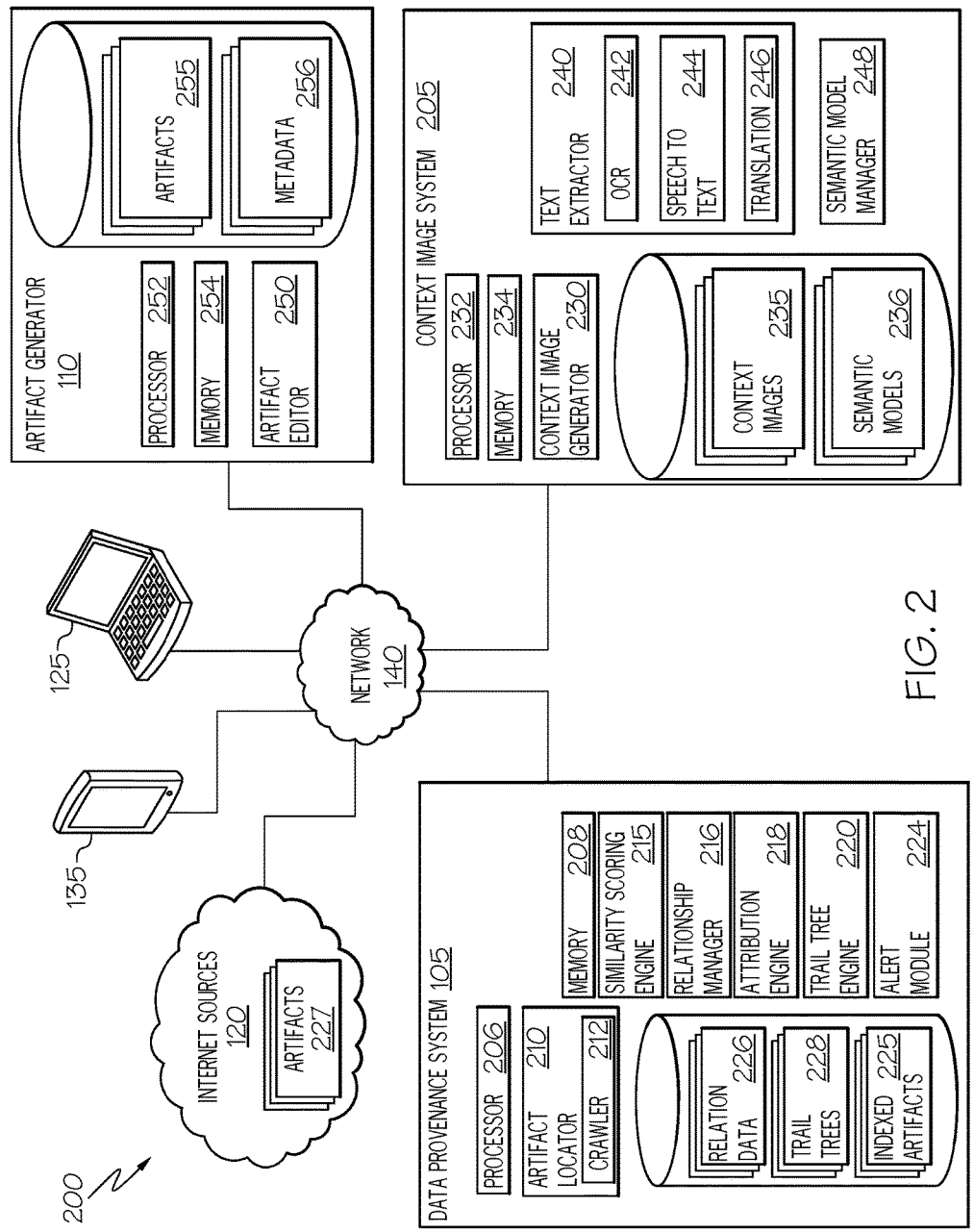
FIG. 2 illustrates a simplified block diagram of an example software system including a data provenance system configured to use context images of a collection of artifacts.

Turning to FIG. 2, a block diagram 200 is shown of an example system including an example data provenance system 105, which may include functionality to address at least some of the issues introduced above. Further, in some implementations, a context image system 205 may be provided for use by (or inclusion in) data provenance system 105 and/or an artifact generation tool (e.g., 110), among other examples. In the example implementation illustrated in FIG. 2, data provenance system 105 may include one or more data processing apparatus 206, one or more computer-readable memory elements 208, and logic implemented in executable software or firmware code and/or hardware-implemented logic (e.g., logic circuitry) to embody one or more components of the data provenance system 105, such as an artifact locator 210, similarity scoring engine 215, relationship manager 216, attribution engine 218, trail tree engine 220, alert module 224, among other example components, including components representing subdivisions or combinations of the foregoing example components.

In some implementations, an artifact locator 210 may be provided that includes functionality to search one or more corpuses of digital artifacts to discover artifacts and at least portions of the respective content of these artifacts to facilitate the discovery or retrieval of artifacts, which may include content similar to another artifact being analyzed (e.g., using similarity scoring engine 215) by the data provenance system 105. In some implementations, the artifact locator 210 may be configured to search and identify artifacts included in indexed collections of artifacts (e.g., 225), such as indexed artifacts stored locally on the data provenance system 105 or remotely on other systems (e.g., companion systems of the data provenance system 105). For instance, artifacts may be indexed according to a particular format or index or as records of a particular format. The artifact locator 210 may possess functionality to generate and provide queries according to these indexes. In some implementations, artifacts may be indexed according to the respective context images 235 generated for each of the indexed artifacts and artifact locator 210 may be configured to structure queries or fetch artifact context images based on an understanding of context image structure, among other example functionality. For instance, an artifact locator 210 may be additionally provided with functionality, such as a web crawler 212 utility, to allow the artifact locator 210 to also scan collections of artifacts outside of artifacts (e.g., 225) indexed in accordance with a data provenance system 105. For instance, a web crawler 212 may operate in parallel with a search of indexed artifacts 225, to allow the data provenance system 105 to search web-based artifacts to identify artifacts outside of those included in an index, which the data provenance system 105 should also consider when analyzing a particular artifact. Artifacts discovered by a web crawler or similar tool may then be processed (e.g., to determine content of the artifacts) and indexed for inclusion in the set of indexed artifacts (e.g., 225) for later use by the data provenance system 105, among other examples.

Artifacts discovered by an artifact locator 210 may be accessed and used by an example similarity scoring engine 215 to determine security scores representing the similarity between content of two artifacts (or portions of two artifacts). For instance, a particular artifact may be provided to the data provenance system 105 for analysis to determine data provenance of the data (or content) of the particular artifact. An artifact locator 210 may perform searches of various artifact repositories or collections (e.g., 120, 225) with the purpose of identifying other artifacts (e.g., 227), which include content that appears similar to content of the particular artifact. For instance, portions of the particular artifact may embody content representing various concepts. A query or search of a corpus of artifacts may be based on the collection of portions identifiable in the particular artifact, with the corpuses of artifacts being searched for other artifacts that include portions similar to any one of the portions of the particular artifact. The artifact locator 210 may thereby find or assemble a collection of other artifacts and may identify the grounds for why each of the other artifacts was identified as being similar to the particular artifact. For instance, in one example, the artifact locator 210 may return results for the particular artifact, which include a mapping of various portions of each of the returned other artifacts to respective portions of the particular artifact. In this example, the results generated by an example artifact locator 210 may be thought of as a preliminary or "rough" similarity analysis, identifying a narrow slice of artifacts for which a more in-depth analysis by the data provenance system 105 may yield more precise determinations of similarity between respective portions of the particular artifact and each of potentially multiple portions identified in the other artifact, among other examples.

A similarity scoring engine 215 may be provided to assess a particular artifact to determine the degree of similarity between content of the particular artifact and other artifacts identified as potentially similar to the particular artifact (e.g., using artifact locator 210). For instance, the similarity scoring engine 215 may compare portions of content determined to be at least somewhat similar to determine a more precise measurement of the similarity between the portions of content. A similarity score may be generated to identify the degree to which any two portions of content are similar. For instance, a higher similarity score may be defined to indicate that the portions of content are identical or very similar, while lower scores may indicate a lower degree of similarity. In some implementations, a similarity scoring engine 215 may utilize a series of techniques to compare content of two artifacts. In some cases, the techniques utilized by the similarity scoring engine 215 may be based on the respective media type of the artifacts. In some implementations, artifacts may be pre-processed (e.g., using video or image filtering, audio filtering, optical character recognition, speech-to-text processing, etc.) to facilitate the comparison of two artifacts. Comparison may include identifying whether or to what degree the precise content (e.g., the explicit text, audio, video, image, etc.) is identical. Where the artifact portions are determined to be less than identical, the artifacts may be further processed to determine whether the concepts represented by the artifact portions is the same or not. In this manner, a similarity score or result generated by a similarity scoring engine 215 may identify not only instances where one artifact incudes a copy or approximate copy of content included in the other artifact under comparison, but may also or alternatively indicate whether the concepts described in the two artifacts (including two artifacts of different media types) are effectively the same. In some implementations, a similarity scoring engine 215 may utilize context images (e.g., 235 generated for the respective portions under comparison) to determine similarity scores. For instance, a context image may allow portions of different artifacts of different media types to be compared, with the context image representing the meaning or underlying concepts of a piece of artifact content, rather than the similarity of the precise wording, syntax, language, or form embodied in the content of artifacts under comparison, among other examples.

An example data provenance system 105 may further include a relationship manager 216, which may use similarity scores returned by a similarity scoring engine 210 to define relationships between two or more artifacts (e.g., from the artifacts returned by artifact locator 210 in connection with the analysis of a particular artifact). For instance, the relationship manager 216 may define a relationship (e.g., in records or metadata maintained in the index of artifacts (e.g., 225) maintained by the data provenance system 105) between two artifacts based to identify that portions of the two artifacts are sufficiently similar to suggest that the later-created of the two artifacts potentially appropriated the subject matter of the earlier-created artifact. For similarity scores indicating a less than sufficient degree of similarity (e.g., as defined by a threshold similarity score value or window of similarity score values, etc.), the relationship manager 216 may refrain from defining a relationship. Further, a relationship manager 210 may define relation data 226 (which may be incorporated in records or metadata of indexed artifacts 225 or maintained in separate records (e.g., a graph or relationship database, or other data structure)) to define that a relationship has been determined between two portions of content of two respective artifacts. The relation data 226 may be further used (e.g., by relationship manager 216) to associate relationships of a first artifact (with other artifacts) with another artifact for which a relationship has been determined (e.g., based on corresponding similarity scores determined by similarity scoring engine 210). As an example, a similarity score may be generated to indicate that a first artifact incorporates content of a second artifact. Relation data 226 may already exist for the second artifact indicating that the second artifact incorporates this same content from a third artifact predating both the first and second artifacts. The relationship manager 216 may thereby associatively apply the relationship between the second and third artifacts to the first artifact (e.g., without a similarity score being determined between the first and third artifacts) and generate corresponding relation data 226 to memorialize the determined relationship, based on the previously determined relationship between the second and third artifacts and the newly determined relationships between the first and second artifacts (e.g., relating to a same portion of the second artifact's content). In this manner, the relationship manager 216 may develop chains or trees of relationships and interrelationships between artifacts discovered and assessed by an example data provenance system 105.

The relationships between artifacts determined by an example relationship manager 216 may serve as the basis for determining that a particular one of a set of artifacts is the original source of a particular piece of content or a particular concept. For instance, an earliest-authored artifact in a chain of artifacts, may be identified as the original source of a particular portion of content. An attribution engine 218 may utilize relation data 226 to determine that content in one artifact is attributable to another. Such attribution or data provenance determinations may be further utilized (e.g., by an alert module 224 or other tool) to generate actions by the data provenance system 105 to encourage or enforce proper attribution to a source artifact. For instance, an attribution engine and/or alert module (or other component of the data provenance system 105 may return a citation to be incorporated in a particular artifact determined, by the data provenance system 105, to include source material of another artifact. In some cases, this citation may be automatically incorporated in the particular artifact, for instance, through the data provenance system's interaction or interoperation with an artifact generation tool (e.g., 110). In another example, in response to determining a relationship between two artifacts, alert module 224 may cause an alert or notification message to be provided for presentation to a user associated with the artifact determined to include content potentially attributable to another owner's artifact to alert the user as to the potential intellectual property rights infringement, the need to provide a proper attribution, among other information. In some cases, an alert module 224 or attribution engine 218 may additionally have access to information concerning a particular artifacts use policies (e.g., licensing terms, copyright terms, attribution preferences, etc.) and the data provenance system 105, upon determining a potential data provenance issue may perform an action (e.g., provide an alert, generate attribution or citation data, etc.) in accordance with these policies, among other examples.

In some instances, data provenance services provided by an example data provenance system 105 may be complicated by the fact that artifacts may be continually modified, creating multiple versions of an artifact. Accordingly, it may be difficult to identify which of multiple different versions of an artifact may be the original source of particular content or a particular concept. Alternatively or additionally, it may be similarly difficult to identify which version of the artifact is the most recent, such that determining the proper version of the artifact to cite or assign attribution to may be problematic, as may be that newer versions no longer include the same content or may include an updated version of the content, among other issues. Accordingly, in some implementations, an example data provenance system 105 may include a trail tree engine 220 providing functionality to track (e.g., through trail tree data 228) versioning between the various artifacts maintained and/or indexed using the data provenance system 105.

In the past, paper artifact dominated the publishing landscape are essentially unmodifiable after publication. To "change" it one would issue a new edition—a costly and slow process that made provenance more manageable. Online artifacts, by contrast, can be (and often are) frequently updated. For instance, online artifacts may be databases having explicit structure. Some technologies (e.g., the development of XML/JSON) have blurred the distinction between artifacts and databases. Further, online artifacts/ databases may contain data extracted from other artifact/ databases using query languages or "screen-scrapers".

Figure 3:
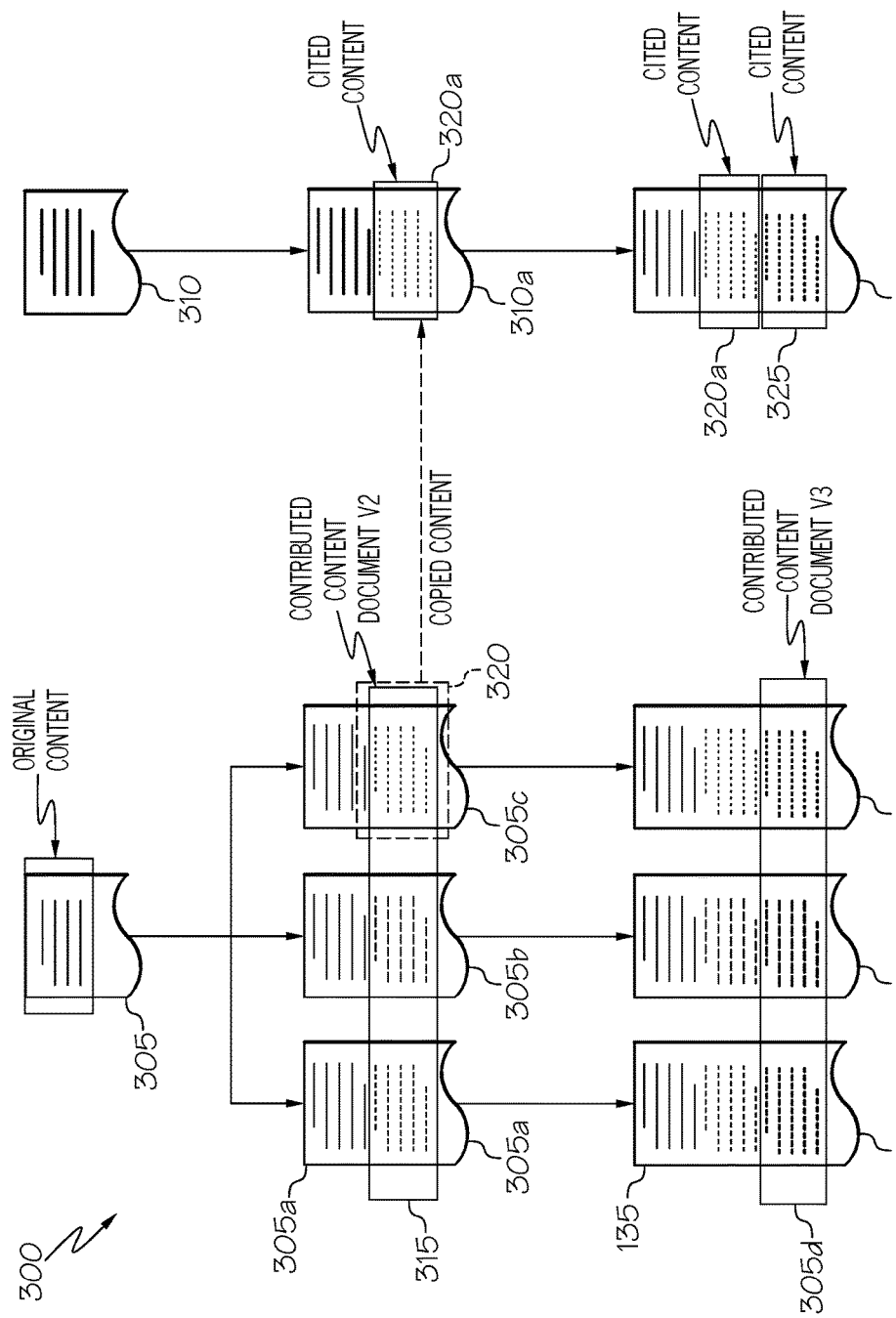
FIG. 3 illustrates a simplified block diagram representing versioning within digital works.
Figure 4:
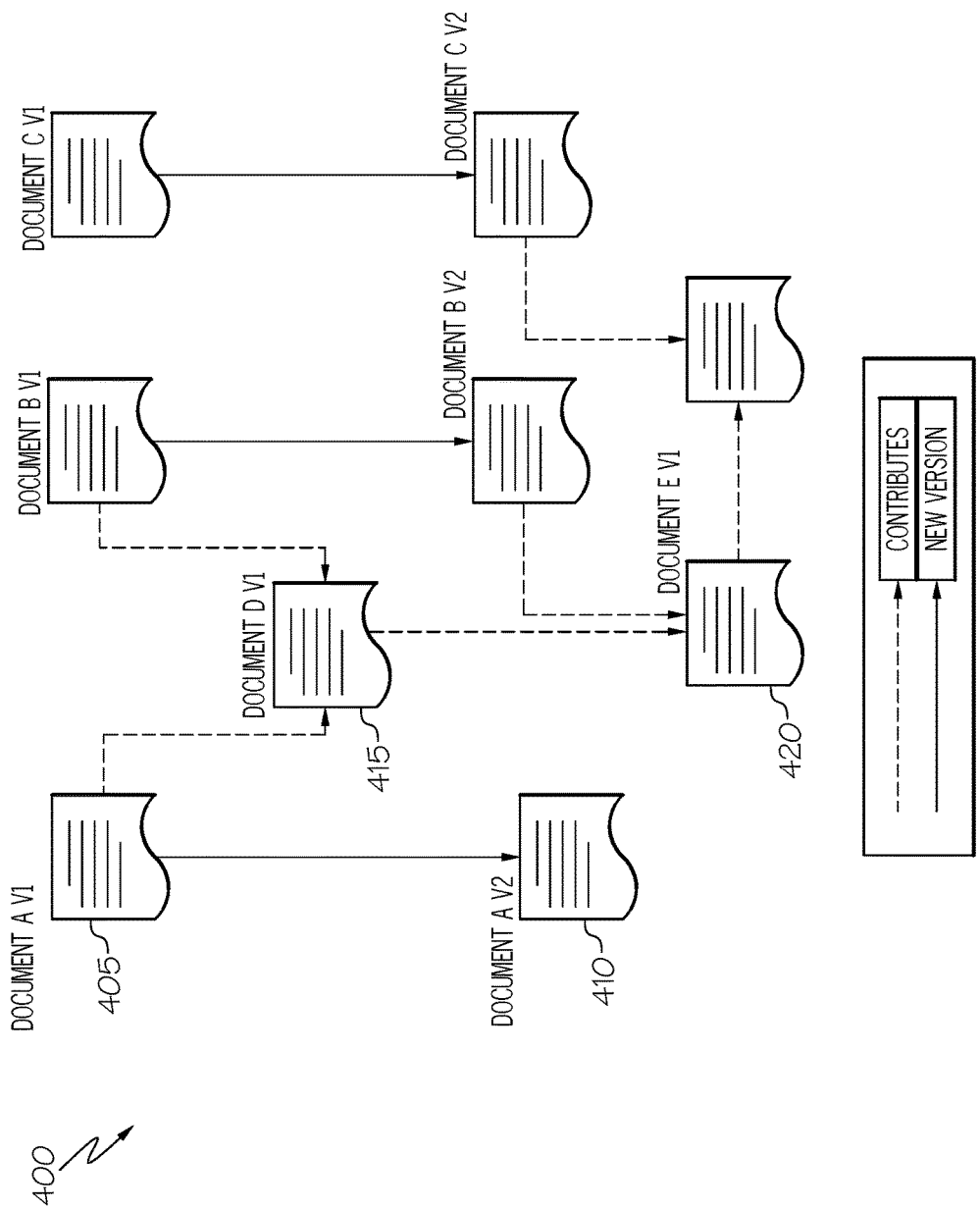
FIG. 4 illustrates a simplified block diagram representing versioning and contributions within digital works.

Turning to FIGS. 3 and 4, simplified block diagrams 300, 400 are presented to illustrate example issues confronted in maintaining data provenance of electrical artifacts. For instance, in the field of molecular biology, a substantial fraction of research in genetics is conducted in "dry" laboratories using in silico experiments involving analysis of data in the available databases. Such databases are not simply obtained by a database query or by on-line submission, but may involve human intervention in the form of additional classification, annotation and error correction. However, it can be very difficult to determine where a specific piece of data comes from. In literary fields, including literary, scientific and academic publications, research papers, white papers, etc., digital libraries may be developed and maintained, which may include a heterogeneous collection of on-line artifacts accessible by tools such as browser software for exploring the collection. Digital libraries may also be organized so that they serve as scholarly resources. In some cases, citations within these documents may be according to particular standards, although citation of portions of artifacts, such as XML artifacts may be less clear. For instance, a URL link may provide a universal locator for an artifact, but it may be less clear how to proceed within the artifact. In yet another example, even in situations when a good formulation, or even a standard, for data citation is provided, such that an example artifact A cites a (component of an) artifact B, it may be unclear whose responsibility it is to maintain the integrity of article B. For instance, the owner of artifact B may choose to update the article, thereby invalidating the citation in artifact A.

To generalize the scope and vastness of the data provenance issues presented by digital artifacts, the following example use cases are presented:

An author ($A_1$), publishes a study ($S_1$) article online via blog post. Another author ($A_2$), finds the article online, and wishes to reuse and cite the study in his own study ($S_2$). $A_1$ wishes to be accredited for his work and mentioned as reference, if his work has been cited, raising the issue of original author accreditation.

An author ($A_1$), publishes a study ($S_1$) article online. Another author ($A_2$), finds the article online, and wishes to reuse and cite the study in his own study ($S_2$). $A_2$ wishes to be accurate and thus wishes to be able to cite the latest version of the article, raising the issue of the authenticity of the article.

An author ($A_1$), publishes his study ($S_1$) article online. Another author ($A_2$) finds the article and decides to publish the article by rewording, as his own, thus violating copyrights. $A_1$ wishes to be notified for such cases, raising issues of copyright infringement.

An author ($A_1$), publishes his study ($S_1$) article via secure channel and the article can only be purchased. A publisher ($P_2$) buys the article and decides to publish the article online for free, as his own, thus violating copyrights. $A_1$ wishes to be notified for such cases, raising issues of intellectual property infringement.

An author ($A_1$), publishes his article online. Another author ($A_2$) acquires the article and decides to contribute to the article. $A_2$ wishes to be credited for the same and wishes to make the artifact available to the world from the original source rather than just publishing on his own forum, raising the issue of proper contributor accreditation.

An author ($A_1$), publishes his article. He wishes to keep track of where the entire article is being used and how many versions are available of the same. The analytics of trace and trail should be known to all the contributing authors, raising issues relating to accurate usage analytics.

Turning to the block diagram 300 of FIG. 3, two original versions 305, 310 of two different artifacts are shown. The original version 305 of the first artifact may include original content. When the original version is modified (e.g., as in versions 305a-c), new content (e.g., 315) may be added or at least some of the original content may be changed. In the example of FIG. 3, the original version 305 is modified three different times (potentially by the same or different authors), resulting in three, different parallel versions 305a-c of the first artifact. These modifications may be tracked by a data provenance system (e.g., using a trail tree structure), such that each modification to a version is linked to the original version. This may result in a tree of different versions (e.g., 305a-f), such as illustrated in FIG. 3. Similarly, modifications to the second artifact 310 may be tracked and involve additions or changes to the original content in the second artifact 310.

As further illustrated in the example of FIG. 3, modifications to an artifact (e.g., 310a) may include the addition of content (e.g., 320) from another artifact (e.g., 305c). Illustrating the complexity that may result when managing data provenance among artifacts having various versions, in the example of FIG. 3, content 320 added to a first version of artifact 305 may result in second version 305c. Another artifact 310 may be modified by copying or otherwise appropriating this content 320 into the other artifact (at 320a) to form a second version 310a of the other artifact. As a result, the content 320a in artifact version 310a is attributable to a particular version (e.g., 305c) of an artifact, but not the original artifact (e.g., 305) itself. Modified artifacts (e.g., 305a-c, 310a) may be further modified, in some cases by adding content from other artifacts (as with content 325 in artifact version 310b appropriated from the artifact version 305f), to form still additional versions (e.g., 305d-f, 310b, etc.) and corresponding branches in trail trees maintained to track versioning of an artifact. The simplified block diagram 400 of FIG. 4 shows another example of the complicated webs of relationships that may be defined between artifacts and artifact versions by a data provenance system, including relationships indicating that one artifact (e.g., 405) is a modified version of another (e.g., 410) and that artifacts (e.g., 415) may be determined to be related to other artifacts (e.g., 420) based on a determination that the artifact (e.g., 415) contributed content to the other artifact (e.g., 420), among other examples. Through a data provenance system, each of these relationships may be defined and manages, allowing subsequently determined relationships between artifacts to be built upon and associative relationships to be defined, among other example features and benefits.

Returning to the discussion of FIG. 2, in some implementations, a data provenance system (e.g., 105) may include or interoperate with logic of a context image system 205 operable to inspect, and in some cases, transform artifacts, and determine the context or meaning of the content within the artifacts. The context image system 205 may then build a context image model 235 for the content to reflect and represent this meaning. These context images 235 may then be used, in some cases as a proxy for the actual artifacts and their content, to assess artifacts for similarity with other artifacts. In one example implementations, a context image system 205 may include one or more data processing apparatus 232, one or more computer memory elements 234, and logic implemented in executable software or firmware code and/or hardware-implemented logic (e.g., logic circuitry) to embody one or more components of the context image system 105, such as a context image generator 203, text extractor, semantic model manager 248, natural language processing logic, and so on. In one example, context image generator 230 may include natural language processing logic to enable context image generator 230 to generate context images based on textual representations of respective pieces of content within various artifacts. A context image generator 230 may identify from the text, a key term representing a topic in the piece of content and may further determine that other terms in the text modify, describe, or otherwise provide context for the topic, with these other terms forming attribute terms. In one implementation, the resulting context image (e.g., 235) may be generated as an association node graph, to associate the extracted attribute terms with the extracted key term, among other example implementations.

In some implementations, a context image system 205 may generate context images for content in any one of a variety of media types. In some instances, this may involve converting content from one media into a common media type, such as text or another media type, from which the context image generator 240 may generate a corresponding context image 235 based on this common media type. This may allow a collection of context images 235 to be determined and utilized to compare content of artifacts in different media types, among other example features and benefits.

In one example, context image generator 230 may generate text-based context images. For content (e.g., in a literary work, web page, software code, etc.), the content may already be text-based. For other non-text content, included in the same or different artifact, the context image system 205 may first scan the artifact content to determine opportunities to convert the content to text, for instance, using text extractor logic 205. For instance, text present in image or video artifact content may be extracted using optical character recognition logic 242, audio from audio artifacts or video artifacts may be converted to text using a speech to text engine 244, and so on, to convert various content mediums into text. In some cases, content may additionally be in various different languages, and a language translation module 246 may be provided in some implementations to translate text extracted using text extractor 205 into a common language to be used in the context images 235. This may content in different languages in different artifacts (which may additionally be in different media types) to be standardized and compared.

Upon identifying text content, either from the artifact itself or as converted from another media type by the text extractor 240, natural language processing functionality of the example context image system may be used to determine meanings for each word in text phrases included in the text content. In some instances, semantic models 236 may be defined and utilized by the NLP functionality of the context image system 205 to map one or more terms to respective meanings. Similarly, translation module 246 can also make use of semantic models 236 to map terms in multiple different languages to the same meaning, such that the translation module 246 can determine that two terms in two different languages have the same meaning. In some implementations, a semantic module manager 248 can be provided with the context image system 205 (or another system) to provide, update, and otherwise manage a set of semantic models 236 utilized by the context image system 205 and supporting NLP to generate context images 235 for pieces of content in artifacts (e.g., 225, 226) discovered or otherwise known to data provenance system 105.

In some implementations, a data provenance system 105 may request that a context image is generated (e.g., using context image system 205) for each artifact (e.g., 225, 227, 255, etc.) that the data provenance system encounters or is to perform a comparison (e.g., to generate a similarity score). Indeed, context images 235 may be particularly useful in performing comparisons to identify when the content of one artifact is being/has been appropriated by another. In other instances, generating context images 235 may be considered too costly in terms of time and resources for a context image to be generated for each and every artifact encountered by a data provenance system 105. In other cases, the data provenance system 105 may have defined conditions for when a context image is to be generated for an artifact. For instance, context images may be generated (and incorporated in the records or index) of the indexed artifacts 225 associated with the data provenance system 105. As context images may be a syntax-free representation of the effective meaning or subject matter of an artifact's content, context images may be reserved for use by a data provenance system 105, in some implementation, in instances where artifacts are suspected to have similar, but not identical content. For instance, a similarity score engine (e.g., 215) may first attempt to identify whether exact copies of content of one artifact is included in another (e.g., via a text comparison, bitmap comparison, audio comparison, etc.). If content of an artifact is determined to not include a precise or even substantially identical copy of content from another artifact, the content of the artifact (and/or other artifact) may be presented (e.g., by the data provenance system 105) to cause the context image system 205 to generate one or more context images from the artifact content. The context images may then be compared to determine whether the concepts and subject matter of two pieces of content are similar and to what degree they are similar, thereby allowing a similarity score engine (e.g., 215) to generate scores reflecting such similarities, among other example implementations.

As introduced above, in some implementations, artifact generation tools (e.g., 110) may be provided that are compatible with or that may co-function with an example data provenance system 105. For instance, the generation or modification of artifacts (e.g., 255) using an artifact generator 110 may cause a data provenance system 105 to automatically (and, in some cases, in real time) assess the generated artifact to determine whether the artifact may include content attributable to any other, preexisting artifacts (e.g., artifacts 225, 227). Further, a trail tree engine 220 of an example data provenance system 105 may also automatically track and respond to the generation of modified versions of artifacts using artifact generator 110 to generate and add to trail tree structures to track the new artifacts generated using the artifact generator 110, among other examples.

In some implementations, an example artifact generator 110 may include one or more data processing apparatus 252, one or more computer memory elements 254, and logic implemented in executable software or firmware code and/or hardware-implemented logic (e.g., logic circuitry) to embody one or more components of the artifact generator 110, such as artifact editor 250. One or more artifact editors 250 may be provided to generate and/or edit content in one or more different media types for various artifacts 225. In some cases, the artifact generator 110 may additionally create metadata 256 to describe various attributes of the artifacts 255 generated or modified using the artifact editor 250. For instance, metadata 256 may be generated to document such attributes as an identity of the user responsible for creating or modifying the artifact, an owner (e.g., an individual, business, governmental, scientific, or academic entity, etc.) of the artifact, a subscription or account with a data provenance system service to be associated with an artifact, the geographic location in which the artifact was generated, timestamps, permission levels or authorizations associated with the artifact, among other information. Metadata 256 generated by the artifact generator may be accesses and utilized by a data provenance system 105, in some examples, to inform how artifacts 255 generated using the artifact generator 110 are to be assessed by the data provenance system 105 (e.g., using similarity scoring engine 215, etc.), what types of results are to be generated based on non-content attributes of the artifact (e.g., results appropriate to permissions, geographical restrictions, user or owner identity), among other example uses. Further, metadata 256 may be also used, for instance, by a context image system 205 for use in obtaining information concerning the context of the artifact's generation, which may be utilized (e.g., by NLP logic of the context image system 205, language translation logic (e.g., 248), speech-to-text translation, etc.) to determine various concepts described in pieces of content included in the generated artifacts 255, which may be used by the context image system 205 to generate corresponding context images 235 (e.g., as the artifacts are generated or when triggered by a data provenance system, among other examples).

In some instances, an example artifact generator 110 may be included in or may interface with (e.g., through an application programming interface (API)) one or both of a data provenance system (e.g., 105), context image system (e.g., 205), or other example systems. This may allow artifacts generated by an artifact generator 110 to be assessed as artifacts are being or are finished being generated using the artifact generator 110. Additionally, a data provenance system 105, in some implementations, may provide results of a data provenance service provided through the data provenance system 105 to the artifact generator 110. For instance, the data provenance system may provide data to indicate that the artifact being generated potentially includes content attributable to another artifact and/or author, and cause a corresponding notification to be presented in a graphical user interface (GUI) of the artifact generator 110. In some instances, a data provenance system 105 may provide results to suggest citations or other forms of attribution to be included in the artifact based on such a determined. Indeed, in some examples, the data provenance system 105 may cause such a citation or attribution to be automatically added to artifacts generated using the artifact generator 110, based on the data provenance system's 105 ongoing assessment of the artifacts generated using the artifact generator 110, among other examples.

As introduced above, in some implementations, a data provenance system may be provided to serve as a centralized system, which indexes and maintains a trace of all artifacts that are submitted to it. In some implementations, context images may be utilized and provided by context image generation logic configured to analyze and develop a data structure representing the meaning of the concepts represented in electronic artifacts handled by the data provenance system, among other examples.

In one example of a data provenance system, the data provenance system could be configured as a DPaaS with functionality of data provenance system offered to subscribing entities (e.g., and having corresponding registered credentials). In one example, the data provenance system can provide an endpoint client to be utilized at the computing system of the entity subscribing to the data provenance system. Such an endpoint client may be embodied as a desktop client or app that encrypts/decrypts electronic artifacts to be processed by the data provenance system and gathers local details to be stored in metadata provided with the artifacts. In some implementations, the endpoint client may additionally be responsible for synchronizing modifications to the artifacts and their metadata with a central repository and/or index of the data provenance system. For instance, every time the artifacts are opened or saved from the client machine, the endpoint client may connect to the central data provenance system (e.g., directly at the artifact repository hosted by the data provenance system) using the registered credentials and record events (e.g., artifact creation or modification) corresponding to one of these artifacts generated, edited, or otherwise managed locally by the endpoint client. The data provenance system may additionally include a receptor service which registers and provides a connection interface to all endpoint clients attempting to connect to the data provenance system.

Figure 5:
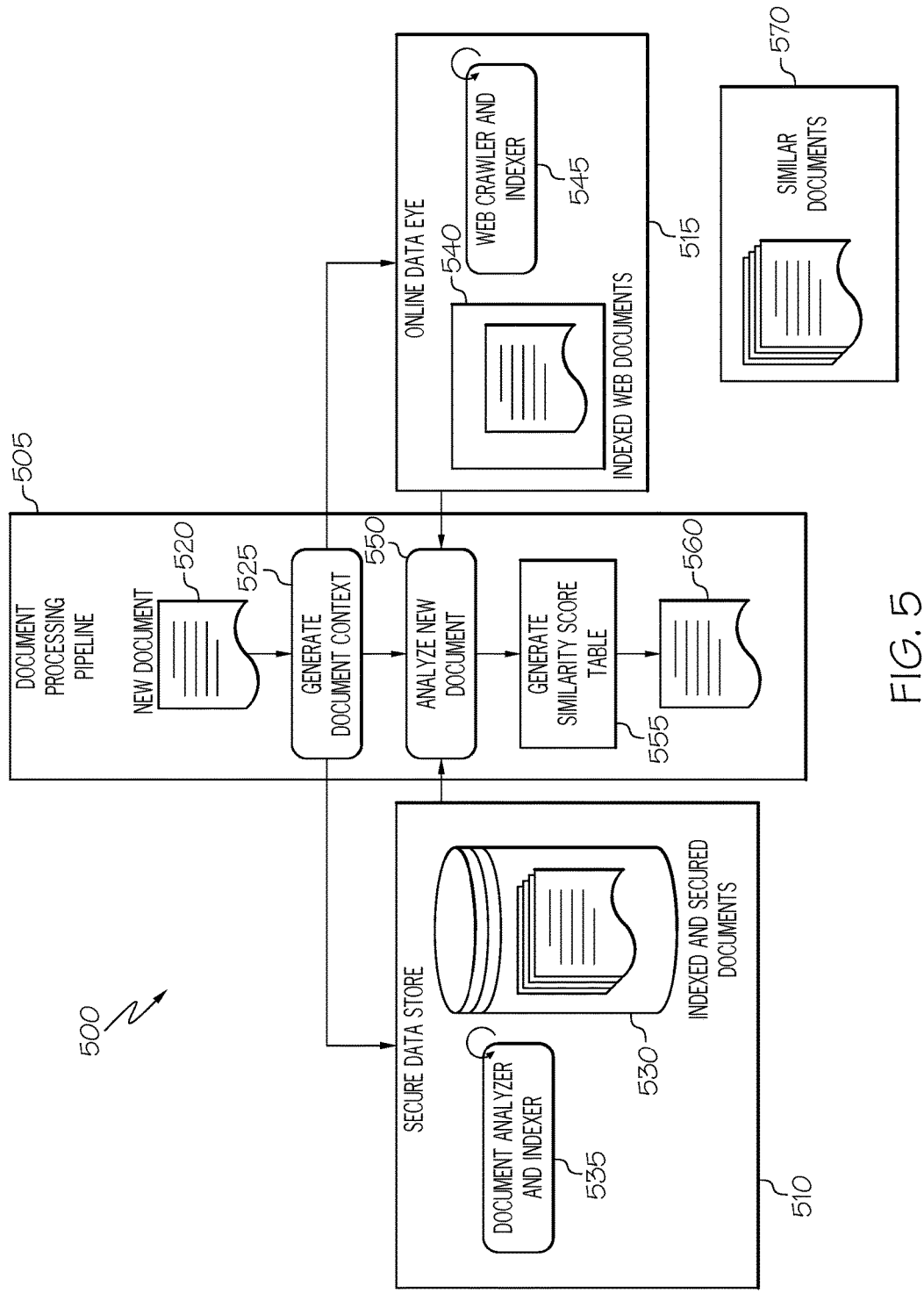
FIG. 5 is a simplified block diagram illustrating an example flow of an example data provenance system.

For example, FIG. 5 provides a representation 500 of an example data provenance system and at least some of its internal components. For instance, in the example of FIG. 5, an artifact processing pipeline 505 of a data provenance system may begin 520 with one or more artifacts being provided as inputs. The data provenance system may process the artifact to extract information from the content of the artifact (e.g., at 525). Based on the information extracted, two parallel processes 510, 515 may begin. First, the data provenance system may search, or process, an indexed, centralized artifact store 530 maintained by the data provenance system for other known artifacts to determine whether any of these artifacts include content similar to the subject artifact being processed in the pipeline. For instance, document analyzer and indexer logic 535 may be provided that is configured to search and identify similar artifacts within the indexed documents 530.

Additionally, or alternatively, the second parallel process 515 may involve the data provenance system utilizing a web crawler 545 or other tool to search and fetch artifacts 540 from web based on contextual search (using the context extracted during the processing of the artifact at 525). For instance, a web crawler, spider, or other automated artifact searching utility may be provided with the data provenance system. In one example, a web crawler may be implemented as an internet bot which systematically browses the web, typically for web indexing. A web crawler may start with a list of URLs of various online resources to visit, called the seeds. Using these seeds, the web crawler may crawl to other pages using hyperlinks. For with each page detected by the web crawler as possessing content of potential similarity to one or more electronic artifacts of interest to the data provenance system, the web crawler may index all the data that is present on the page.

From these artifact identification processes (e.g., 510, 515), the data provenance system may identify a set of artifacts 570 that appear to be similar to the subject artifact. The data provenance system may then (at 550) generate a similarity score for each artifact and thus identify a nearest set of similar artifacts to the subject artifact. These similarity scores, in some cases, may relate to particular portions of the artifacts, in addition to or instead of similarity scores representing the entire of similarity of one artifact to another. The data provenance system may generate a similarity score table (at 555) for the new artifact to summarize the respective similarity scores generated for the artifact and may append this information to the artifact (at 560). Further, based the similarity scores generating from these comparisons, the data provenance system may determine that all or a portion of the subject artifact is sourced from one or more of this set of identified artifacts, either as an explicit copy or a less exact appropriation.

In connection with data provenance analysis, artifacts may potentially be exposed to security vulnerabilities. Accordingly, in some implementations, artifacts of a sensitive nature or for which particular security or document management policies are applied, may be secured using a data provenance system in connection with the tracking of versioning of the artifact. For instance, an example flow is illustrated in the example flowchart of FIG. 6. A user may open 605 or create a new artifact, such as a new document. The artifact generator tool, such as a word processing tool, electronic slide deck creator, or other tool, or even the data provenance system directly, may collect attributes of the user's computing system, such as its MAC Address, IP Address, the user's username (e.g., associated with the user logging-in to a host operating system, the artifact generator, etc.), and other information. The data provenance system and/or artifact generation tool may obtain 610 this information and further request 615 information such as a name for the new artifact, a description, any preexisting taxonomy tags or other metadata for the artifact, and other artifact-specific details that may be collectively added to or used to generate metadata for the artifact. Based on the collected data from machine, the artifact generation tool (or the data provenance system (e.g., when the data provenance system is integrated with the artifact generation system) may then utilize this information fetched from the host and obtained from the user to generate a unique document ID for the artifact, for instance, using the MAC address, document name, and the author's user ID (e.g., through a concatenation of these identifiers). The artifact generation tool (or the data provenance system) may further generate 620 a secret hash and a checksum based on at least some of this information, such as a Base-64 encoded digest hash using the document ID, author details (e.g., information obtained from the user and/or the user ID), the artifact's time of creation timestamp, among other details. Upon creation of this secret hash, the artifact generator may then allow 625 the user to proceed with the generation of a new artifact or artifact version.

Figure 6:
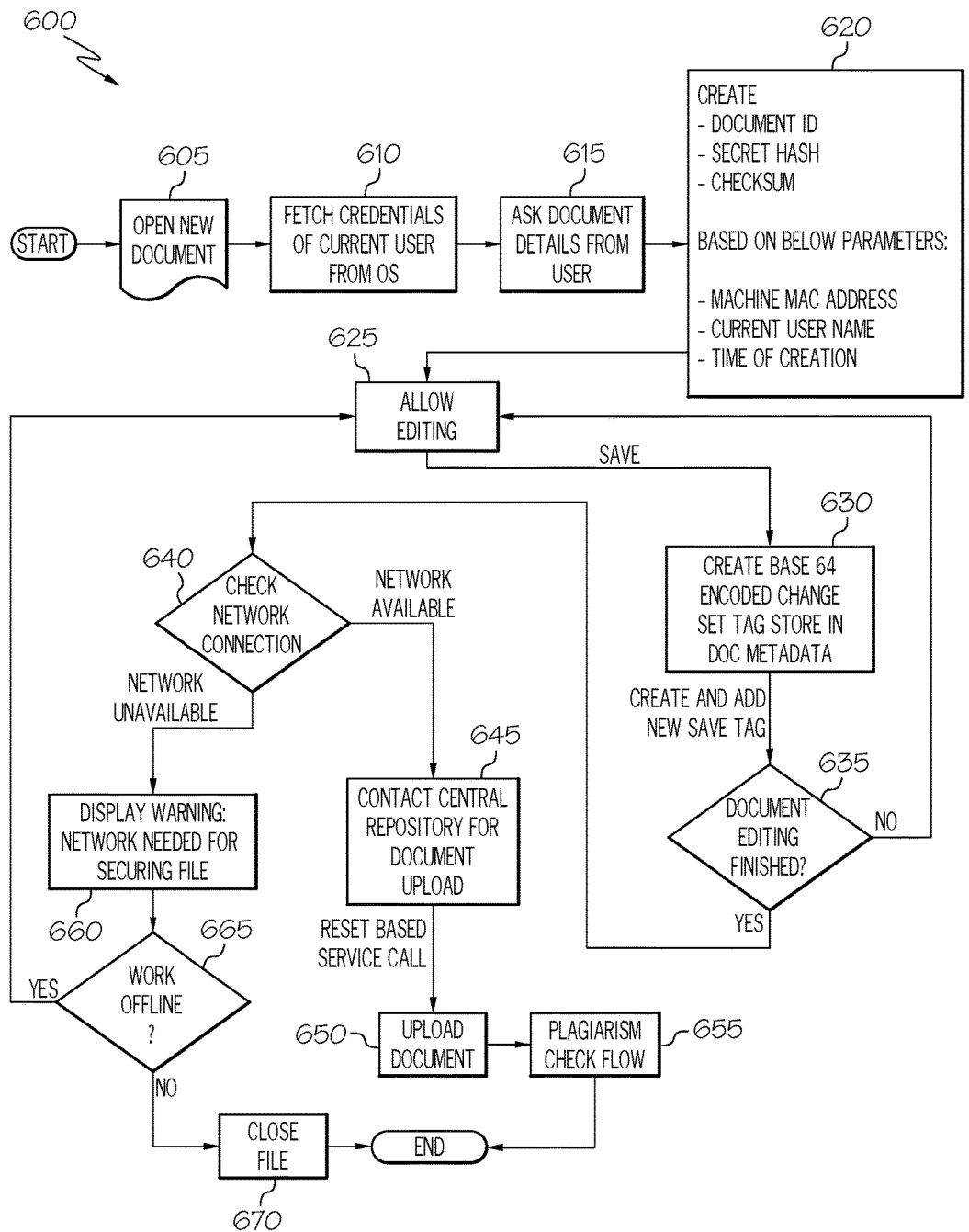
FIG. 6 is a flowchart illustrating the securing of digital works in association with an example data provenance system.

Continuing with the example of FIG. 6, while the user works on the document, on every save (automated by the artifact generator or at the request of the user), a new Base 64 encoded change set tag hash is created, and a new secret hash may be created 630 and appended to metadata of the artifact (e.g., which may be maintained in a secured document metadata store). After the document editing is finished (e.g., as detected by an editing window being closed, the submission or attachment of the artifact to email, detecting that a user has not interacted with the document for a period of time beyond a threshold, receiving a user input to indicate that the editing is finished, etc.), the artifact generator or data provenance system may take additional steps to secure the artifact. In some cases, securing of the artifact may take place automatically. In other cases, the securing of the document may be an optional feature provided for the artifact at the request of the user (or another user, such as an administrator or system security manager, etc.). For instance, upon identifying 635 that document editing is finished, the artifact generator or data provenance system may check 640 for network availability and connectivity. If it is determined that the network is not available, the user may be notified and prompted 660 to connect to a network or work offline (at 665) in order to proceed with securing of the document. In some cases, this may result in the artifact being closed 670 (and queued) until a later time for uploading to the repository. If, however, a network connection is detected, the artifact generator or data provenance system may use the network to contact 645 a centralized artifact repository and upload 650 a copy of the artifact to the repository for access and further processing by the data provenance system. In some implementations, the artifact may be uploaded via a REST API call from the artifact generator to the data provenance system (hosting the repository) or a similar call from the data provenance system to a repository system, among other example implementations. In some implementations, a document signature may be created and returned to the user/author for reference. The artifact may then, or later, be accessed by the data provenance system for analysis, such as a plagiarism or infringement check process flow 655, among other examples.

Figure 7:
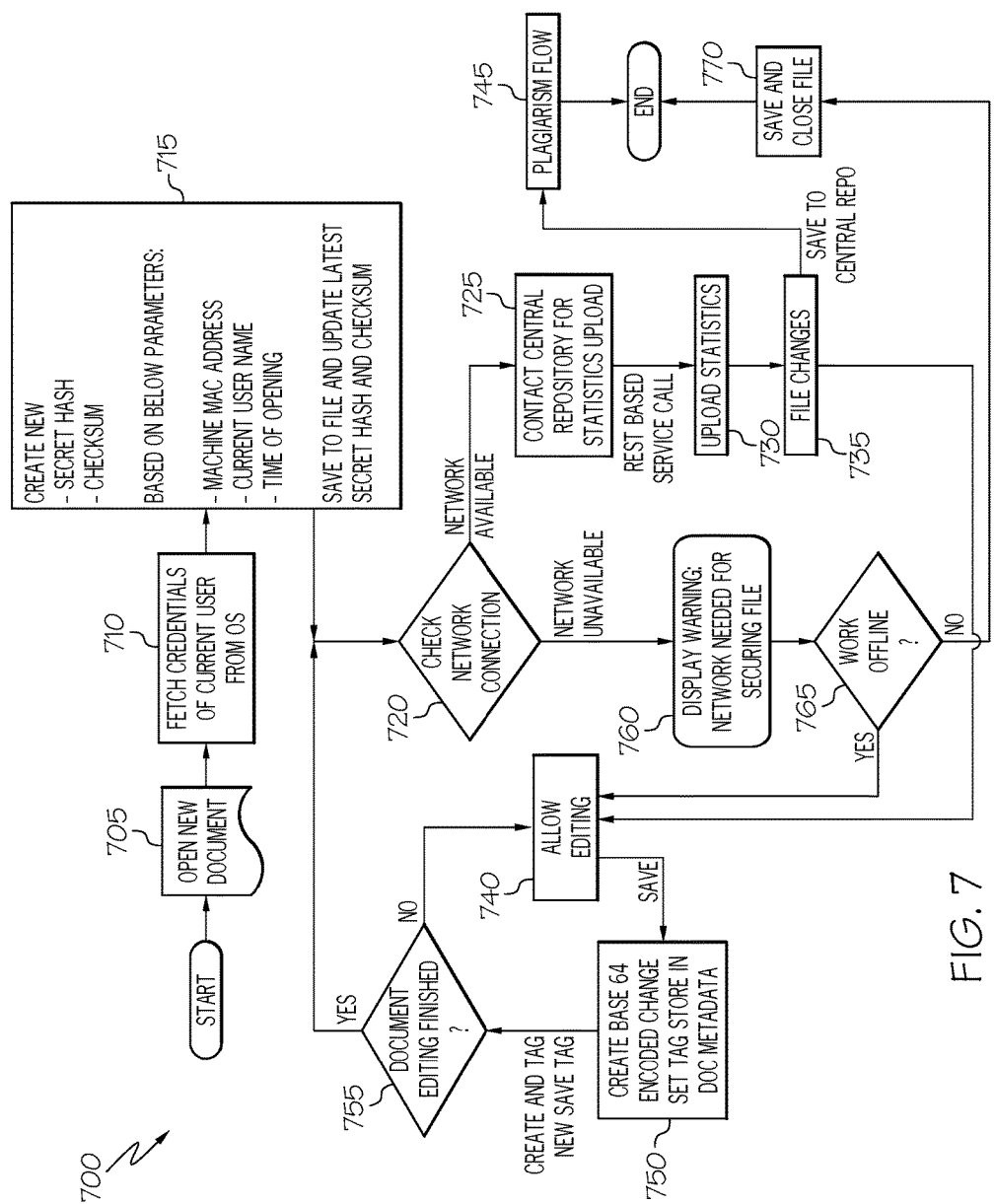
FIG. 7 is another flowchart illustrating the securing of digital works in association with an example data provenance system.

Turning to the flowchart 700 of FIG. 7, a modified version of an example artifact security flow is illustrated. In this example, a user may open 705 a secured artifact, such as a document hosted in an enterprise environment or a document authored using an artifact generator tool, among other examples. Credentials of the user may be collected 710 in connection with the attempt to open the artifact. In some cases, the credentials may be the user's OS sign-in or artifact generator sign-in credentials, among other examples. The artifact generator, in this example, may collect attributes of the host system (of the user, or of the artifact generator itself), such as the system's MAC Address, IP Address, user identifier (e.g., from the user credentials), etc. Based on the collected data from the machine, the artifact generator may generate 715 a secret hash (e.g., a Base-64 encoded digest hash) using machine and artifact attributes such as the document ID, author details, time of opening (timestamp), etc. for the new version of the artifact (which may be added to other hashes generated from other earlier versions of the same artifact, etc.). The new secret hash may then be tagged as the latest hash of the document, and may be appended to or otherwise associated with the corresponding artifact, such as by saving the hash in connection with the maintenance of a copy of the artifact in a central repository associated with a data provenance system. In some cases, the hash may serve as a stand-in for the actual artifact. As in the example of FIG. 6, the artifact generator may determine (at 720) whether a network connection is available to communicate the new hash to the central repository. If the network connection is available, the artifact generator may provide the new secret hash for storage to the central repository (e.g., using a REST API call). Additionally, the central repository may be accessed 725 to retrieve 730 various statistics stored in connection with the corresponding artifact, such as contributor identifier, device details, location details, degree of change (e.g., number of lines changed, etc.). Further, changes detected in an artifact (e.g., vis-à-vis a previous version of the artifact) may be identified and communicated 735 to the central repository, among other tasks.

If the network is not available at this point, then the user may be shown 760 a warning that in order to secure the document, the network should be available. In some cases, the artifact generator may nonetheless allow off line editing 740, which may result in changes to the artifact and a corresponding, new secret hash being generated 750 (e.g., locally at the system performing or monitoring the editing or creation of an artifact) and appended to records in the central repository. In cases where the network is available during a file save for the opened artifact, then the latest artifact records (e.g., hash, statistics, metadata, etc.) generated or determined locally by the system generating or otherwise managing the artifact may be uploaded to the Central Repository using an API (e.g., a REST API) for recording versioning of a previously generated (and secured) artifact, among other example implementations.

Figure 8:
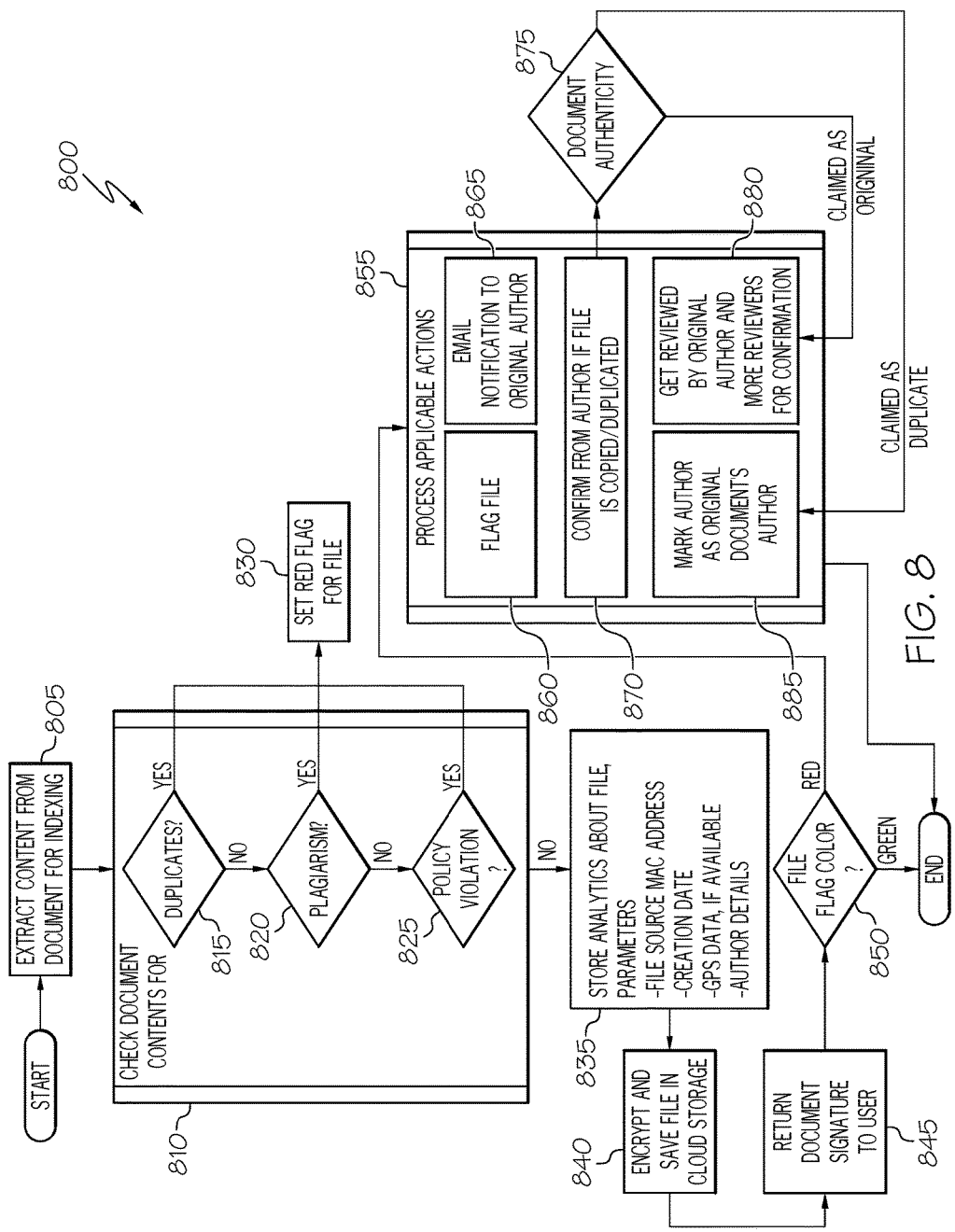
FIG. 8 is a flowchart illustrating the processing of digital works using an example data provenance system.

FIG. 8 shows an example flowchart 800 illustrating an example flow of a process performed by a data provenance system on various artifacts provided to the data provenance system, such as on artifacts securely uploaded to a central repository associated with the data provenance system, such as in the examples of FIGS. 6 and 7. In this example, the data provenance system may access a copy of an artifact provided to the data provenance system and extract 805 content from the artifact for use in indexing of the artifact and comparing the content against content of other artifacts. In some implementations, extracting content 805 may include the generation of a set of context images for the corresponding artifact. With this content, the data provenance system may perform one or more checks 810 relating to data provenance. For instance, the data provenance system may check to determine whether the artifact is a duplicate (at 815) of another artifact (e.g., in the indexed repository of the data provenance system or hosted on an online system), whether particular content of the artifact raises plagiarism 820 concerns (e.g., for having content that is at least partially identical or that describes subject matter previously included in another artifact), or whether the content of the artifact violates one or more policies 825 (e.g., confidentiality policies, obscenity policies, accuracy policies, privacy policies, etc.). If the artifact is found to have issues based on its content, a flag status may be set (at 830) in connection with the artifact (e.g., in metadata appended to the artifact) to indicate the issues and potentially cause additional action (e.g., at 855) to be taken in response.

From the data provenance system's analysis of an artifact, the data provenance system may generate and store 835 analytics in connection with the artifact, such as the address of the artifact's source (e.g., identified by MAC and/or IP address), artifact creation data, global positioning or other location information, author details, among other example information. The artifact may then be encrypted and saved 840 in storage of the data provenance system, such as a cloud-based repository. A document signature may also be returned 845 to the user and may serve as a reference key for the artifact's author for use in locating historical versions and details of the corresponding artifact, among other example implementations.

Based on the data provenance-based inspection of an artifact (e.g., at 810), a flag may be set that is associated with a particular artifact to indicate whether data provenance issues were detected from content of the artifact. In one example, a color-coding scheme may be defined, where a "green" flag indicates no issues and a "red" flag indicates that issues were determined. In cases where the flag defined for a first artifact is green (e.g., based on processing at 810), the process may end with the first artifact indexed and stored in the data provenance system repository. If, however, the flag for the artifact is red, in this example, various actions 855 may be triggered (at 850). For instance, actions may include such examples flagging 860 the artifact file as having potential issues, identifying and notifying 865 another author or artifact owner of another artifact from which the analyzed artifact has been determined to have taken content, generate a prompt 870 notifying the current author of the artifact under analysis of the potential copy/duplication/misappropriation, record 885 a particular author determined to be the author (from the check 810) of particular content (e.g., including generating corresponding attribution or citation information), initiate a verification process by prompting 880 one or more users for confirmation of the data provenance system's conclusion that particular content has been sourced from another artifact (e.g., with the prompts including prompts to the analyzed artifact's owner, the other artifact's owner, owners of other artifacts determined to have similar content, etc.), among other examples. Some of the actions (e.g., calling for and responsive to additional user feedback (e.g., actions 870, 880)) may cause the data provenance system to confirm document authenticity 875 (e.g., that the content is, in fact, original and not appropriated from a different source), among other example actions and implementations.

Figure 9:
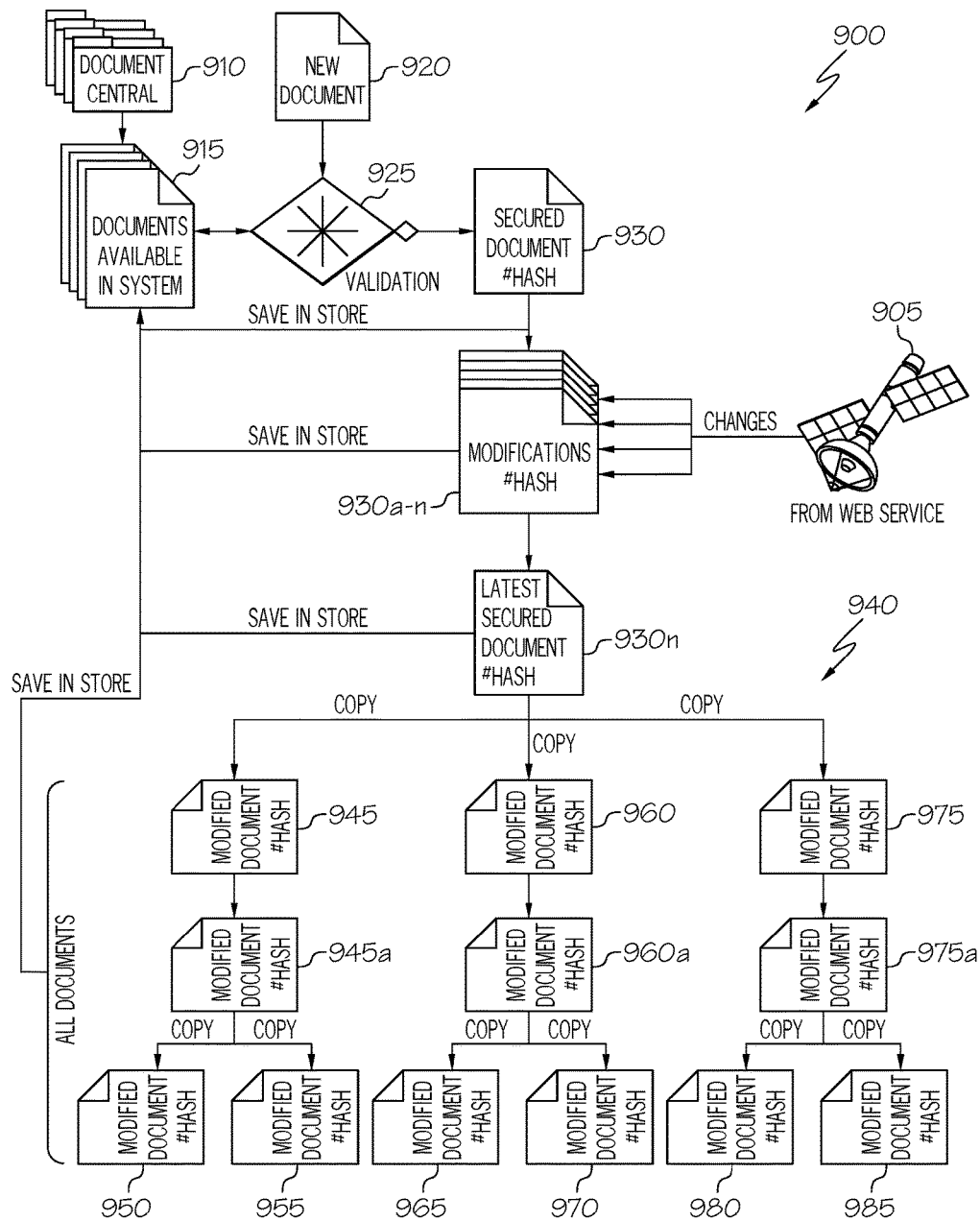
FIG. 9 is a simplified block diagram illustrating the processing and maintenance of digital works using an example data provenance system.

Turning to the example of FIG. 9, a flowchart 900 is presented representing the combined functionality of one example implementation of a data provenance system. A data provenance system may access or identify a new artifact 920 and may validate 925 the authenticity or authorship of multiple sections of the artifact's content. For instance, the data provenance system may compare the content of the new artifact 920 against content included in any one of a variety of other artifacts 915 accessible to the data provenance system, including documents in an indexed centralized repository 910. The data provenance system may additional generate a secured document hash 930 (e.g., using techniques such as those described in connection with FIGS. 6-7) and add the new artifact 920 to the repository. In addition to making a determination (e.g., 925) of whether an artifact includes subject matter from another artifact, the data provenance system may additionally track (e.g., from change data received from data received from various artifact editing or generation tools (e.g., 905)) modifications and versioning of the artifact (e.g., through corresponding modification hashes 930a-n). Each modification hash can be generated in correspondence with the detection of a new version of the artifact (e.g., in connection with save events of the artifact). Modified and versions may also be validated 925 and even re-validated (including the original version) as new the corpus of known artifacts (e.g., 915) is expanded, for instance, through the data provenance system's identification and validation of other artifacts.

In some implementations, an example data provenance system may additionally provide mechanisms for securing artifacts and after artifact data extraction. For instance, in one implementation, the data provenance system may encrypt the artifact using a private-public key combination may be provided through which artifacts, provided to the data provenance system may be secured. In one example, an artifact generation tool or other tool local to the system whereon an artifact is created (or new version is created) may encrypt the artifact and send encrypted version to the data provenance system service. The data provenance service may then decrypt the artifact using its private key, among other example techniques. In one example, all artifacts secured with the data provenance service would be stored in user respective sub-repositories. These sub-repositories may maintain versions and branches of the artifact as shown, for instance, in the example of FIG. 9, to form a versioning trail tree. These versions maintain the user attribution system to maintain author accreditation and each version and branch is considered as a new version of the artifact and may be so maintained by the data provenance service. In one example, a block chain database can be used to maintain the secure identity of each version of the artifact, among other example implementations. Artifact security may also secure artifacts and artifact versions against modification (e.g., by a user editor or author) of any already versioned artifact. Instead, any changes made to any one of the secured artifact versions (including the original version), may directly lead to the creation of a new version along with the definition of the artifact version's place within the artifact's versioning trail tree. Further, the new artifact version resulting from modifications made by a particular user may include an attribution of the modifications to the particular user making the changes.

As further illustrated in FIG. 9, a trail tree record may be maintained (e.g., based on relationships defined between corresponding modified document hashes) to identify the potentially multiple trees or branches of modified versions of a particular artifact (e.g., 930n). For instance, three different branches of the trail tree may correspond to three different changes made to artifact version 930n, with these medications made in parallel resulting in three different modifications (e.g., versions 945, 960, 975 of the same artifact (e.g., 930n) of the same artifact 930n. These modified versions (e.g., 945, 960, 975) can, themselves, be modified and tracked by the data provenance system, resulting in modified versions 945a, 960a, 975a, and further parallel modifications 950, 955, 965, 970, 980, 985, and so on. These various versions can likewise be verified 925, secured, and stored in an indexed central repository 910.

As noted above, in some implementations, a data provenance system may develop context images for at least a subset of the artifacts it encounters, including new artifacts (e.g., 920) and known, indexed artifacts (e.g., 915). A context image may implement a representation of a statement or set of statements, and describe the links between attributes and entities/topics cited in the statements using, for instance, a corresponding graph model. Context images may be built using Natural Language Processing (NLP), which may be used to auto-summarize and generate artifact context, including one or more key terms representing the topic of the statements. Next the key terms are used to identify the attributes associated with the statement's entities to determine an association node graph for the statement. This association graph may be free of semantics and syntax of the language and form the context image of the statement. For each unique statement, a respectively distinct context image may be generated by the data provenance system.

Figure 10:
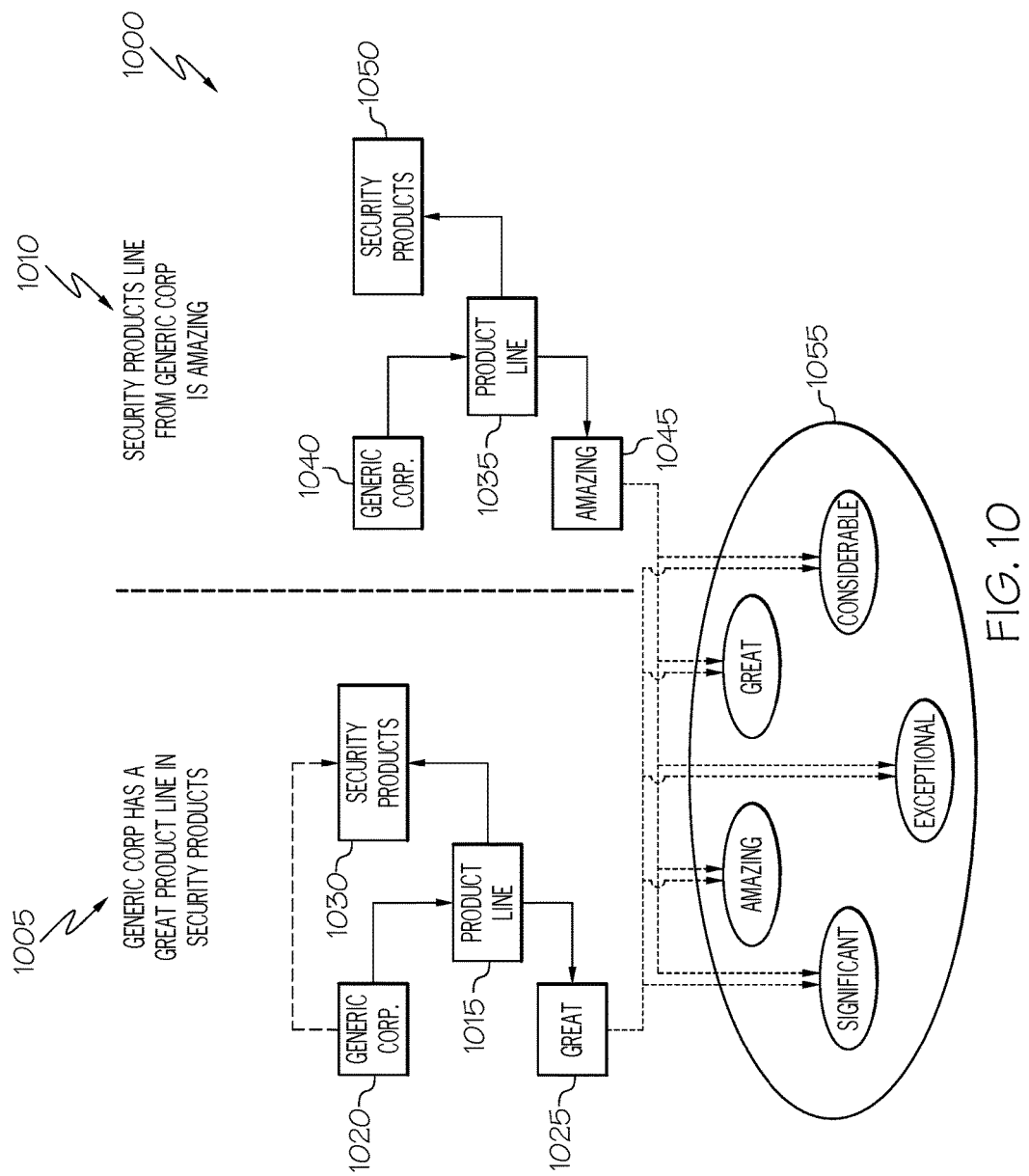
FIG. 10 is a simplified block diagram illustrating the example generation of context images from content of example digital works.

Turning to the example of FIG. 10, an example 1000 is represented illustrating one example of context images, which may be generated using a data provenance system. Two artifacts may be processed to extract text statements 1005, 1010 from the artifacts' respective content. This may include converting non-text media of one or both of the artifacts to text and/or converting the language of the extracted text to a common language, among other example pre-processing steps. Indeed, NLP models may be provided for use in identifying the lingual complexity and thus translate to the common language without language-specific semantics or syntax, and only key terms.

Each of the respective statements 1005, 1010 extracted from an artifact may be processed using NLP to determine that a particular word or term in the statement is a topic of the statement. For instance, statement 1005 may be processed using NLP to determine that the "product line" is the topic of statement 1005. In response, the data provenance system may generate a key graph node 1015 corresponding to the topic "product line." The data provenance system may continue generation of the graph-based context image for statement 1005 by using NLP to identify attributes of topic "product line." In this example, NLP is used to determine that the words "Generic Corp.", "great", and "security products" are all attributes of the topic term "product line." Accordingly, the data provenance system may generate corresponding attribute graph nodes 1020, 1025, 1030 and link these attribute nodes 1020, 1025, 1030 to the topic node 1015 based on the way in which a given attribute is related to the topic to generate the context image of the statement. In this example, the arrows are used as a convention to represent which words modify or describe others (e.g., topics), with the direction of the arrow representing that one word modifies the other (e.g., "amazing" describes the "product line", "product line" describes "Generic Corp." (i.e., what Generic Corp. does), etc.).

In some implementations, each of the term nodes (e.g., 1015, 1020, 1025, 1030) included in a context image may be linked to one or more semantic models (e.g., 1055) identifying a definition or a set of definitions corresponding to a word or groups of words. In some cases, the semantic model may indicate a single definition (such as in the case of a unique word, a proper noun, a word with no known synonyms, etc.). In other cases, such as the example semantic model 1055 shown in FIG. 10, the semantic model may associate multiple terms (e.g., "amazing," "great", "exceptional," etc.) with a common meaning. Based on such semantic models (e.g., 1055), the data provenance system may detect that two different context images (e.g., with different key graph node or attribute node terms) nonetheless have equivalent meanings. For instance, the data provenance system may also determine a context image for the statement 1010 "Security products line from Generic Corp is amazing". For instance, the data provenance system may determine that "products line" is the topic of the statement 1010 and generate a corresponding key graph node 1035 and attribute nodes 1040, 1045, 1050 corresponding to other terms (e.g., "Generic Corp", "amazing", "security products", etc.) the data provenance system determines (through NLP) are attributes of the determined topic.

A data provenance system may compare the context images of two different artifacts based on a determination that corresponding pieces of content within the artifacts may be similar or related. In some cases, the data provenance system may first compare the two pieces of content to identify whether they are identical or substantially identical (e.g., identical in all but minor details) to each other. If the pieces of content are determined to be similar, but not identical, the data provenance system may generate context images for the pieces of content (i.e., if they have not already been generated and are maintained in the artifact repository of the data provenance system) and use these context images to compare the pieces of content to determine whether they express the same idea or concept. In the example of FIG. 10, context images are shown for two different statements 1005, 1010. However, in this example, the data provenance system may compare the context images of these statements 1005, 1010 to determine that the statements express the same concept. This conclusion may be reached despite the context images not being identical (e.g., due to the difference between attribute nodes 1025 and 1045, one (1025) corresponding to the term "great" and the other (1045) corresponding to the term "amazing"). For instance, the data provenance system, when comparing the two context images may consult corresponding semantic models (e.g., 1055) to determine that two different context image nodes (e.g., 1025, 1045), while corresponding to different terms, nonetheless express the same topic or topic attribute (e.g., "great" being the effective equivalent of "amazing"), among other examples. As a result, in this example, the data provenance system may determine that a statement 1005 contained in a first artifact was likely sources from an earlier-created artifact containing statement 1010.

As noted above, an artifact may include multiple pieces of content, which may be expressed as statements. A separate context image may be generated by a data provenance system for each statement in an artifact. Accordingly, multiple context images may be generated for each artifact. Further, the combined or aggregate context images of an example artifact may form an aggregate context image which may be stored and associated with the corresponding artifact. In some implementations, aggregate context images of two different artifact may be compared (e.g., in addition to piecewise comparisons of the composite statement-based context images) to determine an overall similarity between two artifacts, among other examples.

Figure 11:
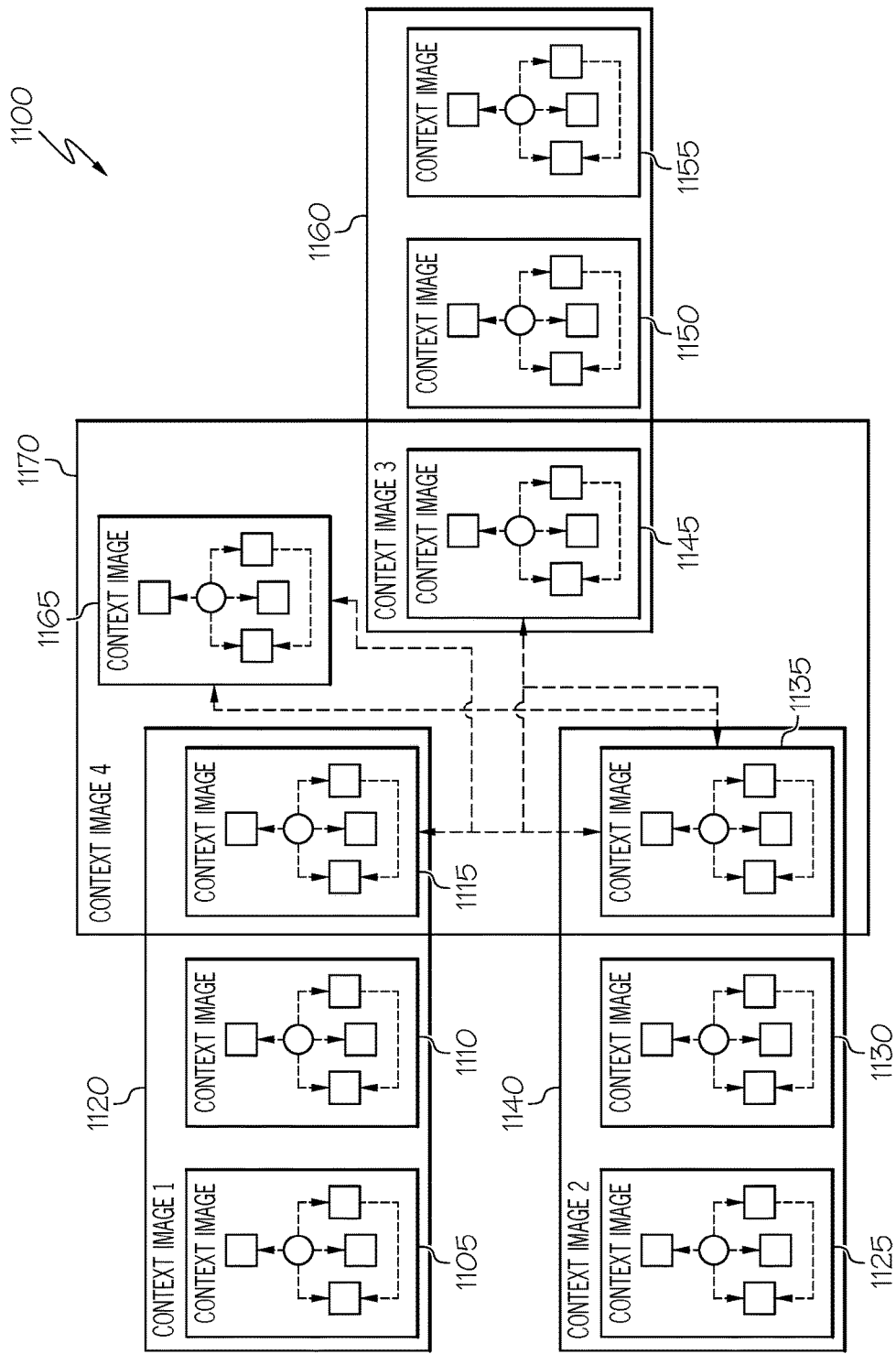
FIG. 11 is a simplified block diagram illustrating example context images generated from different example digital works

Turning to the example of FIG. 11, a simplified block diagram 1100 is shown illustrating context images associated with multiple different artifacts known to an example data provenance system. For instance, a first artifact may include statements from which context images 1105, 1110, 1115 are generated. An aggregate context image 1120 may be generated for the first artifact that includes the composite context images 1105, 1110, 1115. Similarly, context images (e.g., 1125, 1130, 1135, 1145, 1150, 1155, etc.) may be generated corresponding to pieces of content (e.g., converted to statements) in other artifacts, and corresponding aggregate context images (e.g., 1140, 1160) may be generated for these artifacts.

Continuing with the example of FIG. 11, context images may be generated for newly identified or analyzed artifacts. The context images of this artifact may be compared with other context images (e.g., 1105-1160) developed for existing artifacts known to the data provenance system. As represented in FIG. 11, an aggregate context image 1170 may be generated for a new artifact and compared against a collection of context images maintained for known, indexed artifacts of the data provenance system. As shown in FIG. 11, the data provenance system can determine that some of the composite context images of the new artifact map to composite context images (e.g., 1115, 1135, 1145) and determine similarity scores based on comparing these context images with those of the new artifact. Other composite context images (e.g., 1165) of the new artifact may be determined to be unique to the new artifact (e.g., the arrows connecting context images 1115, 1135, 1145, 1165 representing dependencies that may be determined between context images, etc.).

Figure 12:
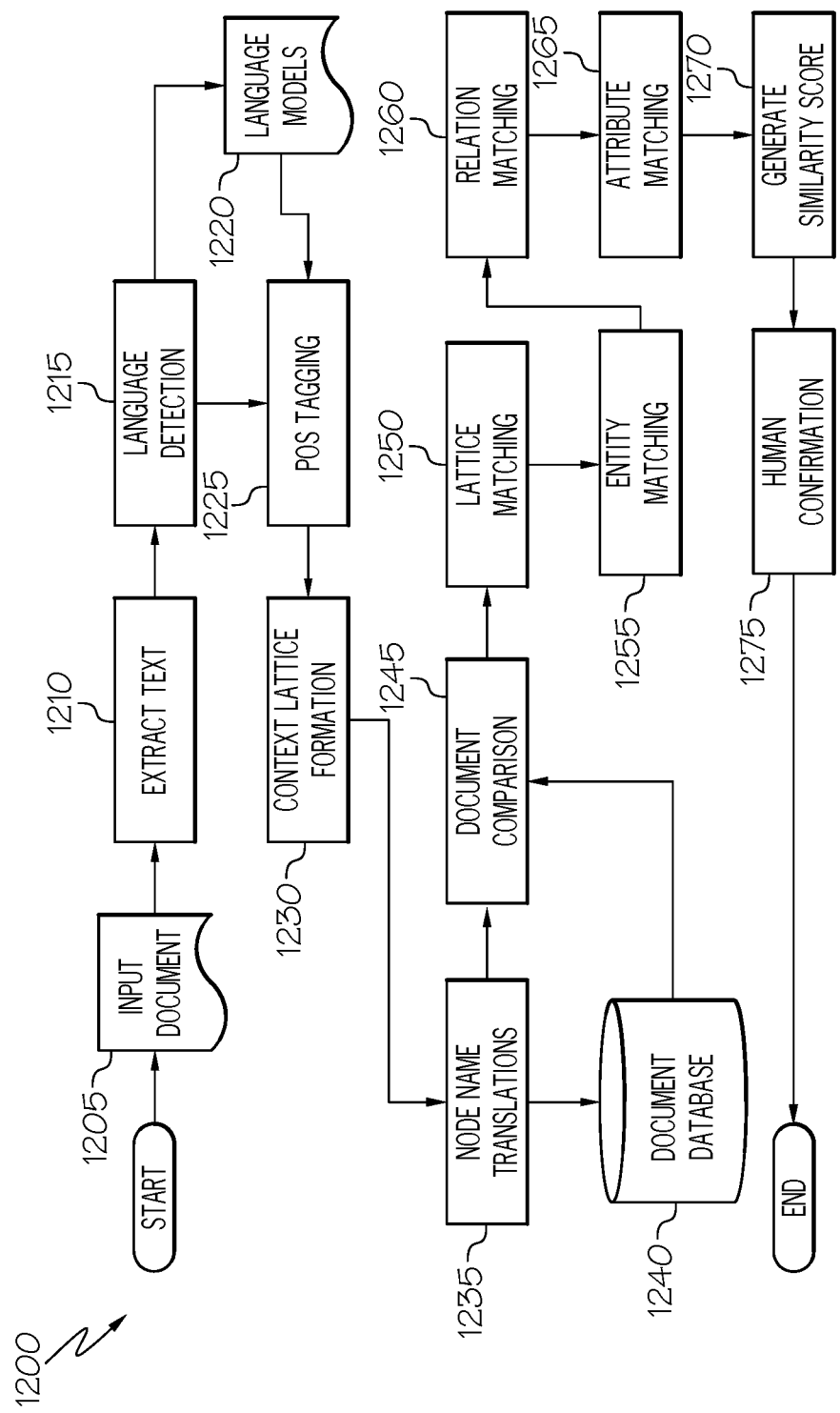
FIG. 12 is a flowchart illustrating the example generation and use of a context image.

Turning to the flowchart 1200 of FIG. 12, techniques are represented for the generation of a context image using a context image generator, such as may be included in or interfaced with by an example data provenance system. For instance, in input artifact may be accessed 1205 and text extracted 1210 from the media of the artifact. Language detection logic may be provided to detect 1215 the language within the text. If the detected language is not already in a common language utilized in the context images, language models 1220 may be employed to convert the text to the common language. For instance, parts of speech (PoS) tagging may be performed 1225 to determine whether each term is a noun, verb, preposition, adjective, adverb, etc. Meanings of each of the words may be determined based on the determined parts of speech attributed to the words (e.g., and based on the use of one or more semantic models). A context image may be generated (e.g., 1230) to interconnect, in a graph model, the words determined to be topics with those words determined to be attributes of or describe the topics. The resulting interconnected graph model may take on a lattice structure representing the meaning of the corresponding statement. Individual words may correspond to nodes in the context image. In some cases, individual nodes may be translated (at 1235) into a common language defined for context images of a particular data provenance system.

With the context image generated for the statements of an artifact, the data provenance system may access an artifact database 1240 to identify context images of artifacts determined to be similar to the input document 1205. Artifact comparison 1245 may be carried out through a comparison of the respective context images of these artifacts. Document comparison 1245 may include determining a degree of match between the lattice structures of each of the context image graphs (at 1250), determining a degree of match between the topics, or "entities", defined in the context image (at 1255), and determining a degree of match between the attributes defined in the context image (at 1260), among other examples.

From the context image comparison(s), a similarity score may be generated 1270 to indicate the degree to which two statements in two different artifacts are likely the same or not. An exact match between the statements may be reflected by a maximum similarity score, a match based on a comparison of context images (e.g., determining that two statements are different, but have the same meaning) may have a somewhat lower similarity score, while statements for which no similarity is identified are assigned a minimum similarity score, and so on along a gradient of potential similarity scores that may be determined between two piece, or portions, of two artifacts' content. Further, in some implementations, such as where the similarity score indicates a positive correlation, but not an exact match (e.g., based on a positive match between two context images), the data provenance system may additionally prompt one or more users for feedback and confirmation (e.g., at 1275) of a conclusion reached by the data provenance system, which the data provenance system may use to confirm its result and initiate an appropriate action based on the comparison of the artifacts, among other example techniques and features.

FIGS. 13A-13B are flowcharts 1300*a-b* showing example techniques for performing data provenance system on digital artifacts. For instance, in FIG. 13A, data of a particular digital work may be received 1305 from a computing system, such as the generator of the particular digital work, or artifact. Data of the particular digital work may be processed 1310 (e.g., using NLP) to determine that a particular concept is included in the content of the particular digital work. Other digital works may also be identified 1315 and compared against the content of the particular digital work to determine 1320 similarity scores indicating a degree of similarity between portions of the particular digital work and respective portions of each of the other digital works. From the determined similarity scores, a data provenance system may be determine 1325 that one or more of the portions of the other digital works is the source of a particular concept described in a particular one of the portions of the particular digital work. These results may be sent 1330 from the data provenance system to the computing system or another computing system and cause one or more actions to be performed to address the sourcing of this content from the one or more other digital works.

Turning to FIG. 13B, to assist in the determination 1320 of similarity scores for digital works processed by an example data provenance system, context images may be generated as graph models describing, in a syntax-free manner, the concepts represented in content of various digital works. For instance, a particular digital work may be accessed 1335, and text may be determined 1340 from content of the digital work. In some cases, the text may be simply identified in the native text-based media of the particular digital work. In other cases, determining 1340 the text of the content may involve converting the media of the particular digital work to text. Natural language processing (NLP) may be performed 1345 on the identified text to determine 1350 that a first word in the text corresponds to a topic of a statement appearing in the text. Additional words in the statement may be determined 1355 to correspond to attributes of the topic based on the NLP 1345. A context image may be generated 1360 (e.g., as a syntax-free graph model) to indicate the topic and the identified attributes of the topic. This context image may be used to compare the content of different digital works, including digital works of different media types, to perform data provenance tasks using a data provenance system, among other example features and techniques.

It should be appreciated that the flowcharts and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as suited to the particular use contemplated.

The invention claimed is:

1. A method comprising:
   accessing, from an index, an electronic artifact comprising content of a particular type of media;
   automatically determining, using a data processor, text corresponding to the content;
   performing natural language processing on the text, using the data processor, to identify at least a subset of words in a statement within the text and determine meanings of each word in the subset of words; and
   generating a context image for the electronic artifact based on the natural language processing, wherein the context image comprises a graph comprising nodes corresponding to the subset of words, the context image comprises a syntax-free representation of the statement, the context image comprises the subset of words but less than all words in the statement, and the context image defines relationships between the subset of words.

2. The method of claim 1, wherein the natural language processing comprises determining that a first word in the statement comprises a key term representing a topic of the statement and further comprises determining that at least a second word in the statement comprises an attribute of the key term, wherein the subset of words comprises the first and second words and the context image defines that the second word is an attribute of the first word.

3. The method of claim 1, further comprising:
determining a plurality of statements in the electronic artifact from the natural language processing; and
generating a plurality of context images for the electronic artifact corresponding to each of the plurality of statements based on the natural language processing.

4. The method of claim 3, further comprising generating an aggregate context image for the electronic artifact comprising the plurality of context images.

5. The method of claim 1, wherein the context image comprises a first context image and the method further comprises comparing the first context image with a plurality of other context images corresponding to a plurality of other electronic artifacts in a corpus to determine a degree of similarly between content of the first context image and a second context image in the plurality of other context images, wherein the second context image is associated with a second electronic artifact in the plurality of electronic artifacts.

6. The method of claim 5, further comprising determining that the second electronic artifact is a source of the statement based on the degree of similarity.

7. The method of claim 6, further comprising generating an annotation for association with the first electronic artifact to indicate that the second electronic artifact is the source of the statement.

8. The method of claim 5, wherein the plurality of context images are included in an index of context images, and the method further comprises adding the first context image to the index of context images and defining, within the index of context images, a relationship between the first and second context images based on the degree of similarity between the first and second context images.

9. The method of claim 5, wherein the second electronic artifact comprises content of a different, second type of media.

10. The method of claim 1, wherein the particular type comprises a text document.

11. The method of claim 1, wherein the particular type comprises an image and determining the text comprises determining text present within the image.

12. The method of claim 1, wherein the particular type comprises a video and determining the text comprises determining one of speech in audio of the video or text included in an image within the video.

13. The method of claim 1, wherein the particular type comprises audio content and determining the text comprises determining speech in the audio content and converting the speech to text.

14. The method of claim 1, further comprising:
determining a language of the text; and
translating the subset of words from the language into a common language for use in the context image.

15. A non-transitory computer readable medium having program instructions stored therein, wherein the program instructions are executable by a computer system to perform operations comprising:
identifying digital media of a particular type;
determining text statements from content of the digital media;
performing natural language processing on the text statements to:
identify a first word in a particular one of the text statements as a key term in the particular text statement, wherein the key term represents a topic of the particular text statement; and
identify a set of second words in the particular text statement representing attributes of the topic;
generating a context image for the statement, wherein the context image comprises a graph comprising nodes corresponding to the first word and the set of second words, the context image comprises a syntax-free representation of the statement, the context image comprises the first word and set of second words but less than all words in the statement, and defining relationships between the nodes to indicate that the set of second words represent attributes of the topic represented by the first word; and
determining a similarity score for the particular text statement based on a comparison of the context image with a plurality of other context images generated from other digital media.

16. A system comprising:
a data processing apparatus;
a memory element storing data comprising an electronic artifact;
a text extractor, executable by the data processing apparatus to determine a text statement from content of the electronic artifact;
a natural language processor, executable by the data processing apparatus to assess the text statement to:
determine meanings of a set of words included in the text statement;
identify a first word in the set of words as a key term in the text statement, wherein the key term represents a topic of the text statement; and
identify a set of second words in the text statement representing attributes of the topic; and
a context image generator, executable by the data processing apparatus to generate a context image for the text statement, wherein the context image comprises a graph comprising nodes corresponding to the first word and the set of second words, the context image comprises a syntax-free representation of the text statement, the context image comprises the first word and set of second words but less than all words in the text statement, and defining relationships between the nodes to indicate that the set of second words represent attributes of the topic represented by the first word.

17. The system of claim 16, further comprising a search tool to identify a set of other context images similar to the context image and determine a relationship between the electronic artifact and a set of other electronic artifacts corresponding to the set of other context images based on similarities between the set of other context images and the context image of the electronic artifact.

18. The system of claim 17, wherein the search tool is to search a corpus of context images generated at least in part by the context image generator from a plurality of other electronic artifacts.

* * * * *